(12) United States Patent
Park et al.

(10) Patent No.: US 11,616,866 B2
(45) Date of Patent: Mar. 28, 2023

(54) INFOLDING-TYPE HINGE STRUCTURE HAVING FLEXIBLE DISPLAY PANEL INSTALLED THEREON

(71) Applicant: AUFLEX CO., LTD., Hwaseong-si (KR)

(72) Inventors: Hyun Min Park, Suwon-si (KR); Seoung Jun Lee, Uiwang-si (KR)

(73) Assignee: AUFLEX CO., LTD., Hwaseong-si (KR)

( * ) Notice: Subject to any disclaimer, the term of this patent is extended or adjusted under 35 U.S.C. 154(b) by 0 days.

(21) Appl. No.: 17/271,341

(22) PCT Filed: Aug. 29, 2019

(86) PCT No.: PCT/KR2019/011101
§ 371 (c)(1),
(2) Date: Feb. 25, 2021

(87) PCT Pub. No.: WO2020/046025
PCT Pub. Date: Mar. 5, 2020

(65) Prior Publication Data
US 2021/0250431 A1    Aug. 12, 2021

(30) Foreign Application Priority Data

Aug. 29, 2018  (KR) .................. 10-2018-0102366
Sep. 21, 2018  (KR) .................. 10-2018-0114486

(51) Int. Cl.
*G06F 1/16*     (2006.01)
*H04M 1/02*    (2006.01)

(52) U.S. Cl.
CPC ........ *H04M 1/0216* (2013.01); *G06F 1/1652* (2013.01); *G06F 1/1681* (2013.01); *H04M 1/0268* (2013.01)

(58) Field of Classification Search
CPC .. G06F 1/1652; G06F 1/1681; H04M 1/0216; H04M 1/0268
See application file for complete search history.

(56) References Cited

U.S. PATENT DOCUMENTS 10,827,633 B2 * 11/2020 Yoo ..................... H01Q 1/2266
2013/0342090 A1   12/2013 Ahn et al.
(Continued)

FOREIGN PATENT DOCUMENTS

JP    2018-035904    3/2018
KR    10-1442622     9/2014
(Continued)

*Primary Examiner* — Anthony Q Edwards
(74) *Attorney, Agent, or Firm* — Lex IP Meister, PLLC

(57) ABSTRACT

An in-folding type hinge structure having a flexible display panel installed thereon for a mobile communication terminal is provided. In the in-folding type hinge structure, a flexible display panel is provided in two panel portions which are foldably connected to each other, in which folding units can perform a stable folding operation while the two panel portions are being folded or unfolded and the two panel portions are supported such that the panel portions do not rotate over 180 degrees when the two panel portions are fully unfolded, whereby damage of the flexible display panel provided on the surfaces of the two panel portions can be prevented.

2 Claims, 27 Drawing Sheets

(56) References Cited

U.S. PATENT DOCUMENTS

2016/0378203 A1* 12/2016 Kim ................. G06F 1/1679
                                                    345/156
2017/0115701 A1*  4/2017 Bae .................... G06F 1/16
2020/0371564 A1* 11/2020 Kim ................. H04M 1/022

FOREIGN PATENT DOCUMENTS

| KR | 10-1752708      | 7/2017 |
| KR | 10-2018-0040117 | 4/2018 |

* cited by examiner

[Fig. 1]
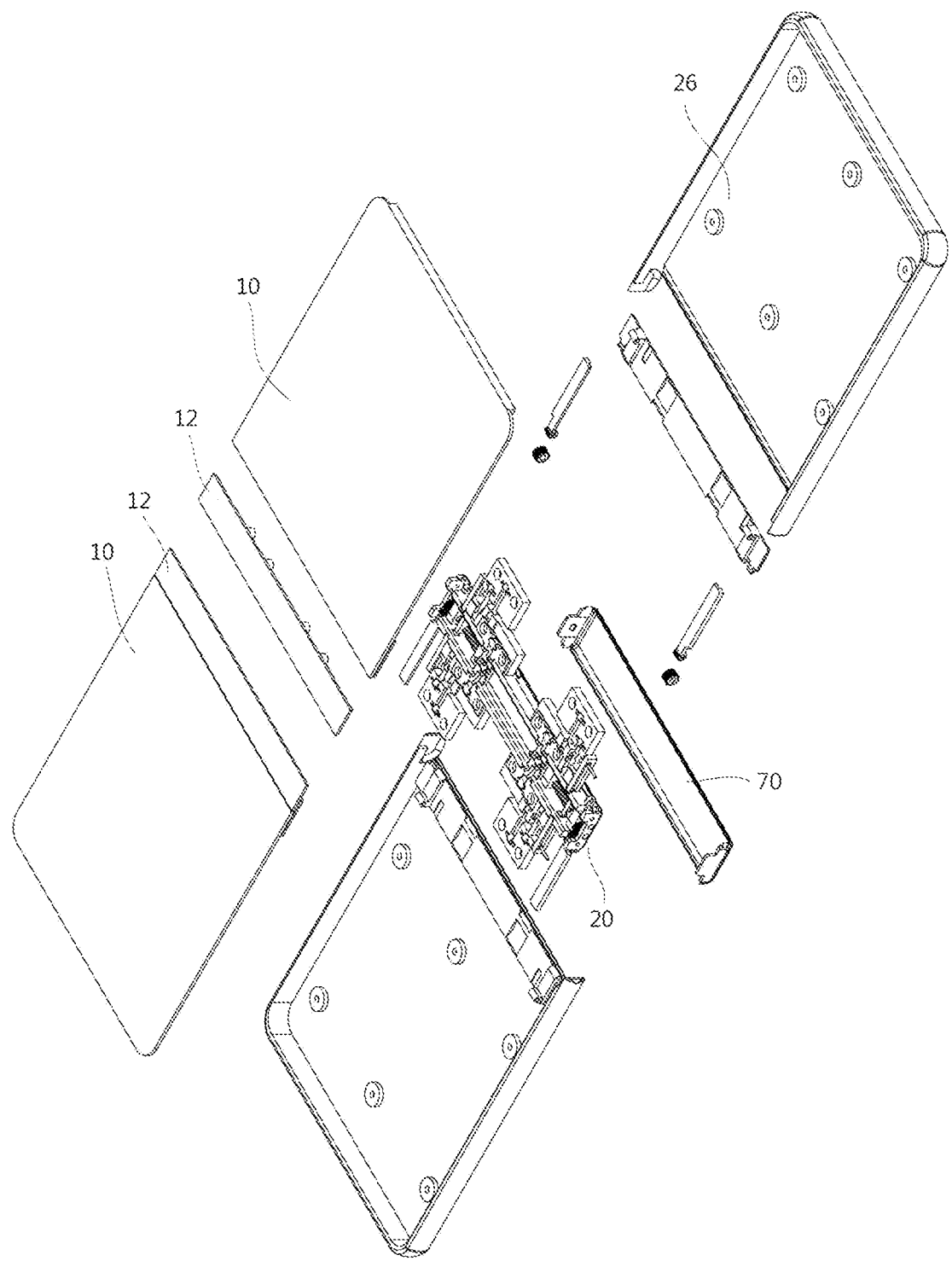

[Fig. 2]
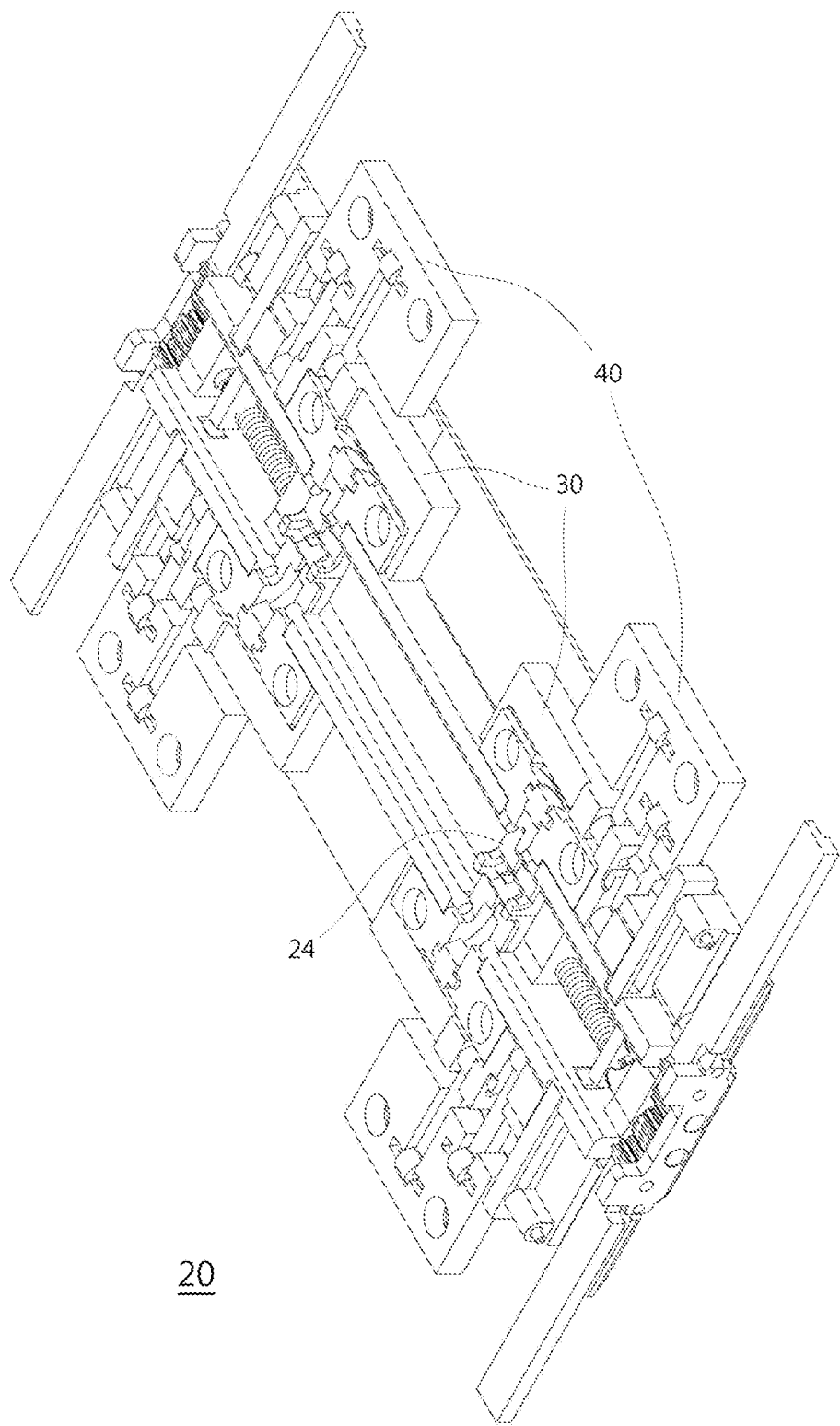

[Fig. 3]
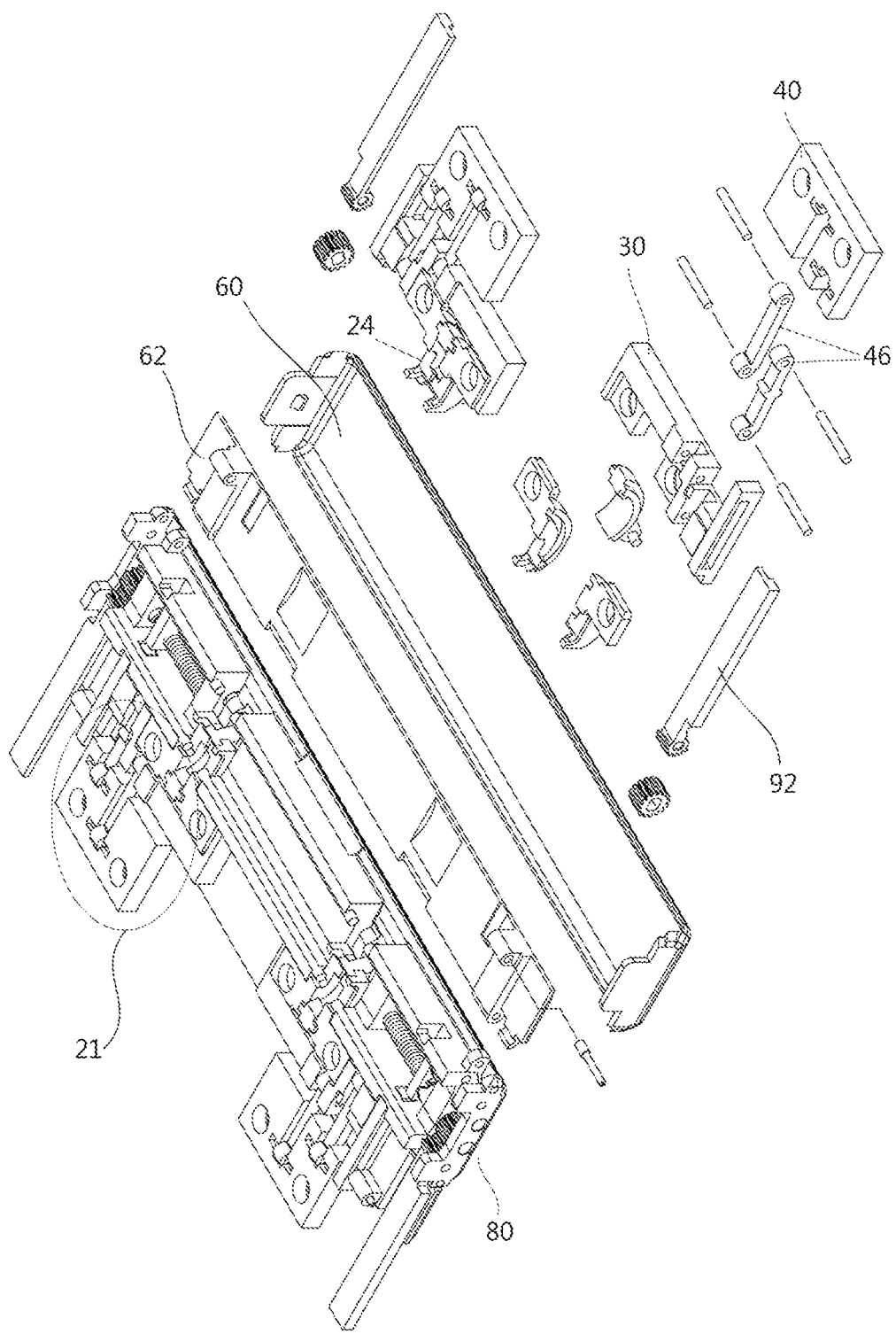

[Fig. 4]
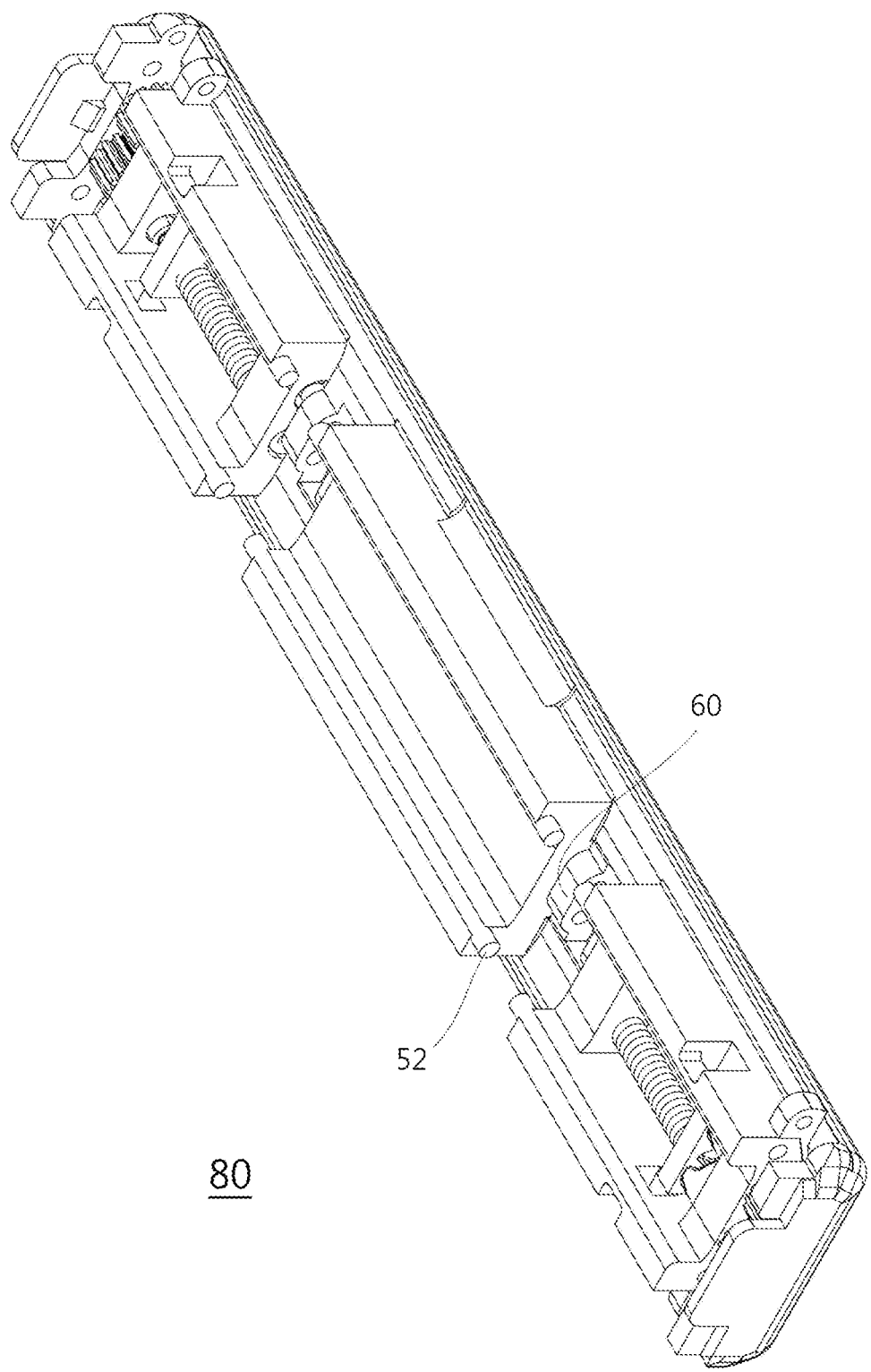

[Fig. 5]
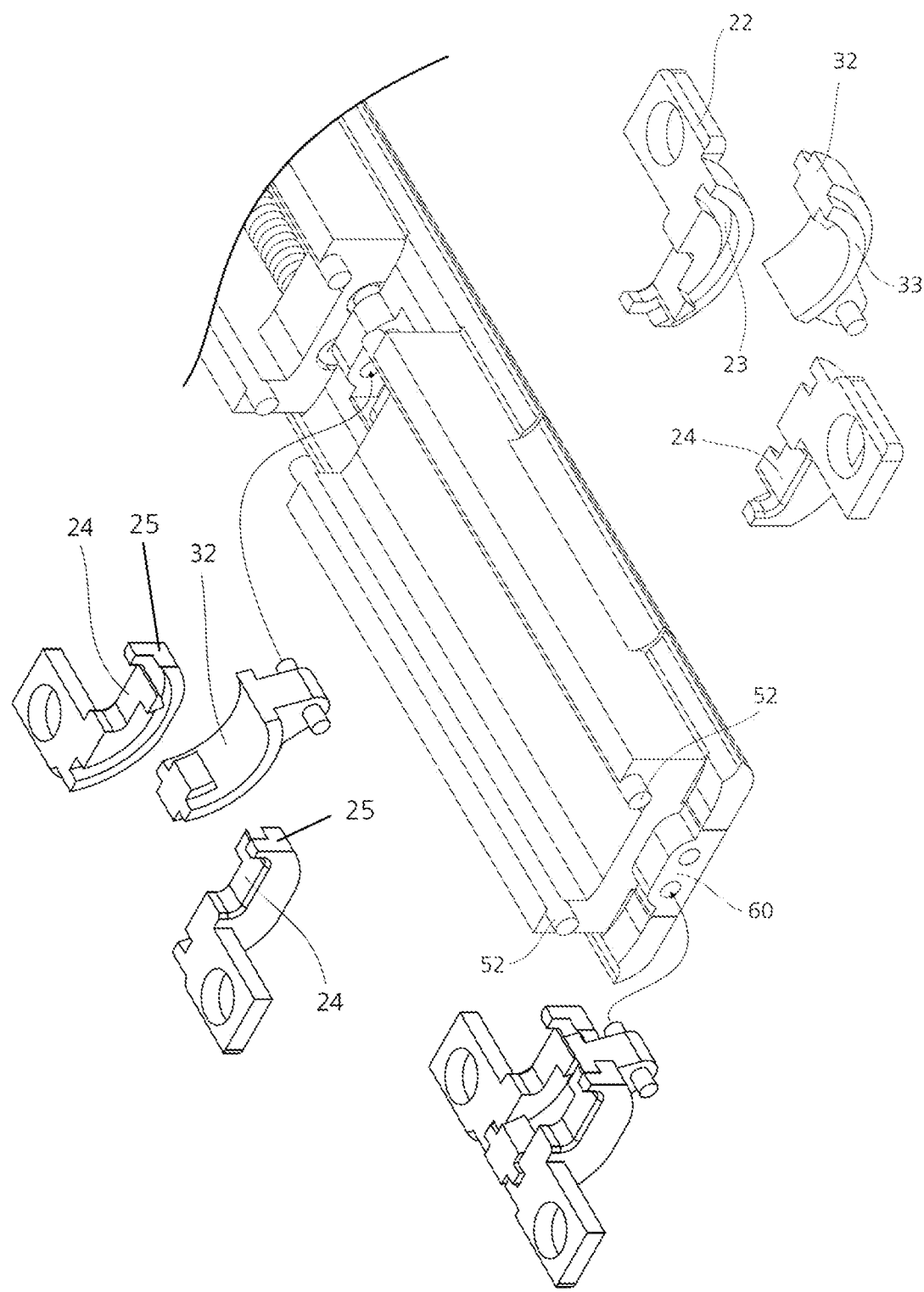

[Fig. 6]
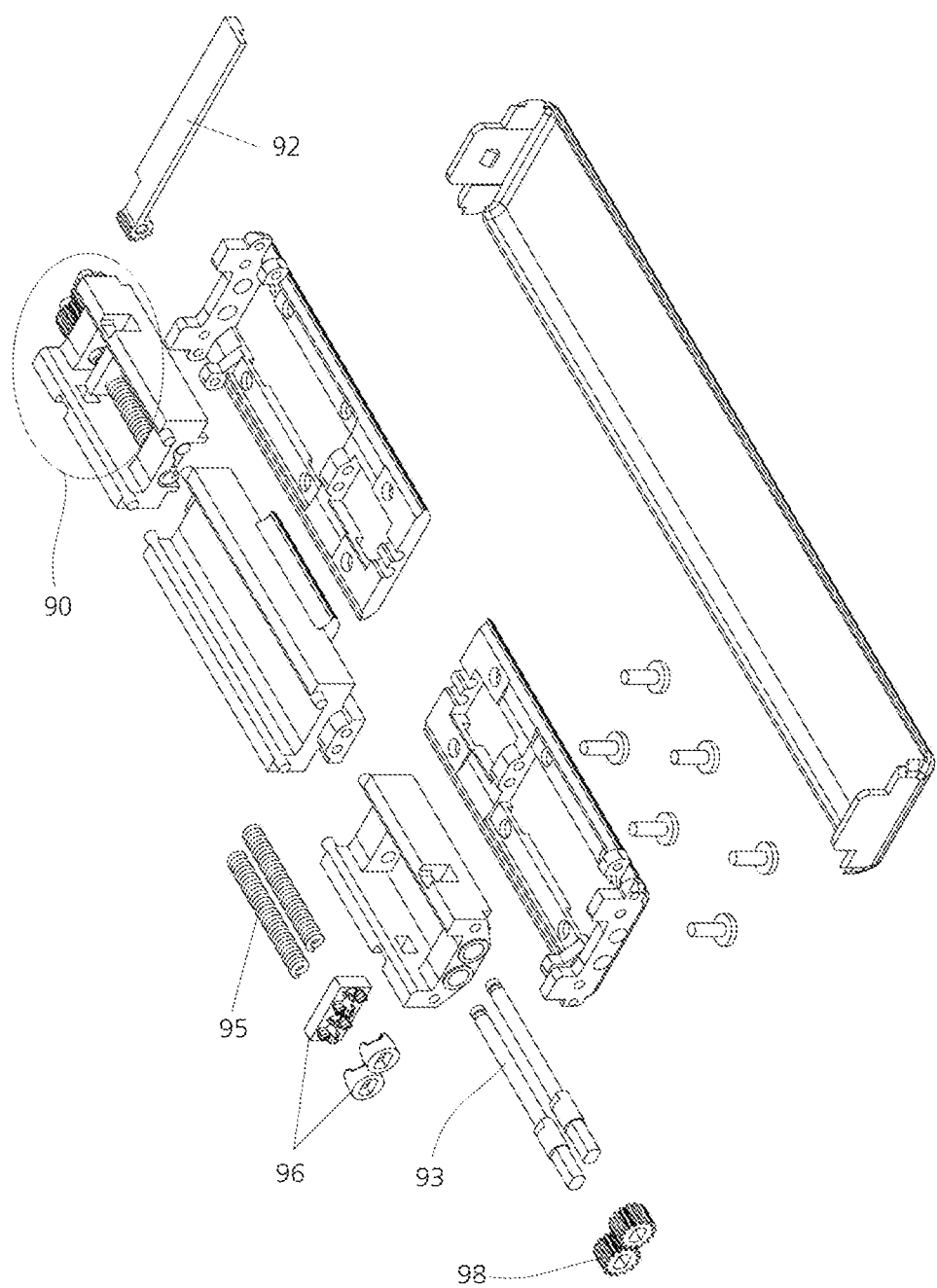

[Fig. 7]
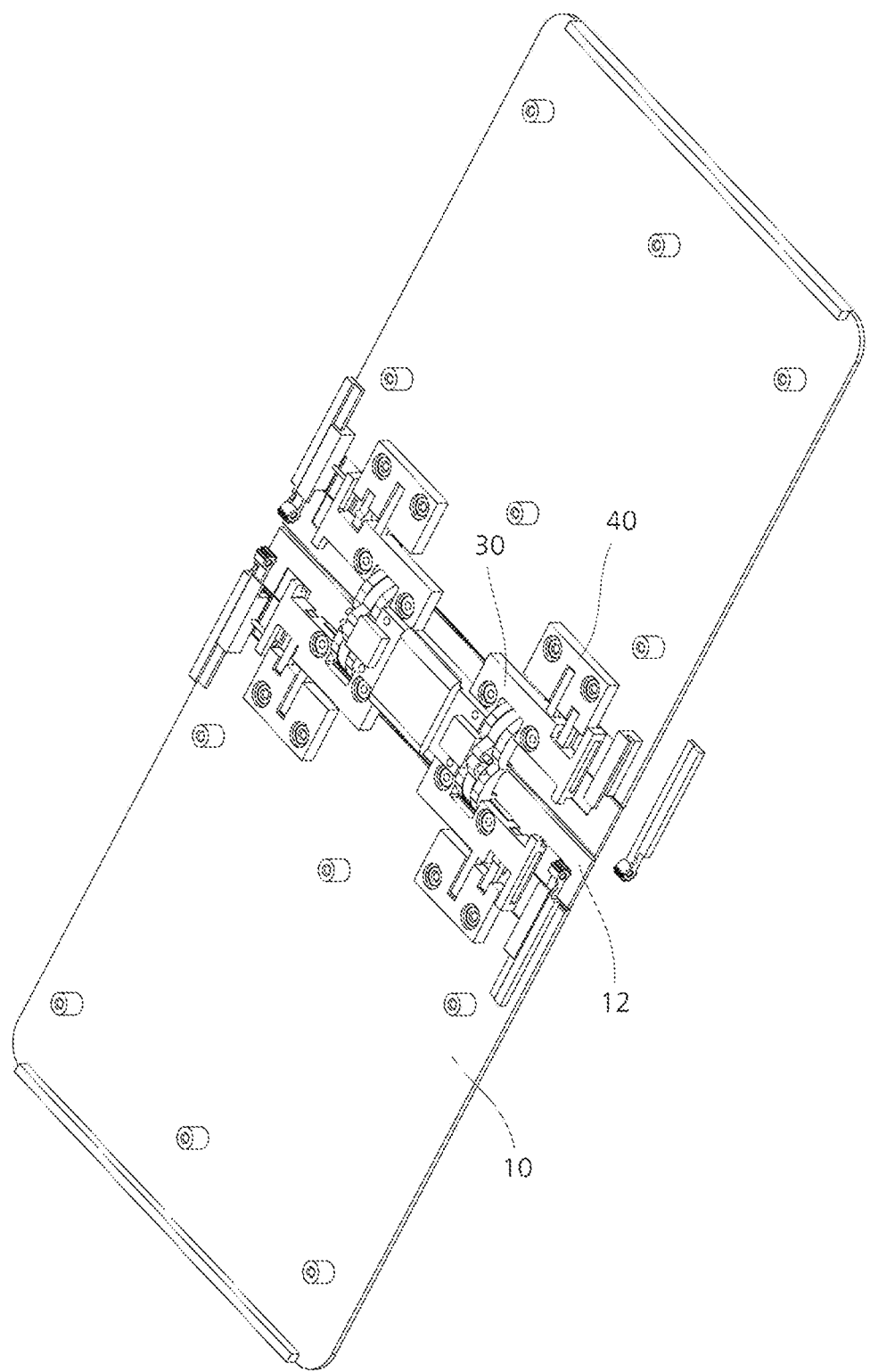

[Fig. 8]
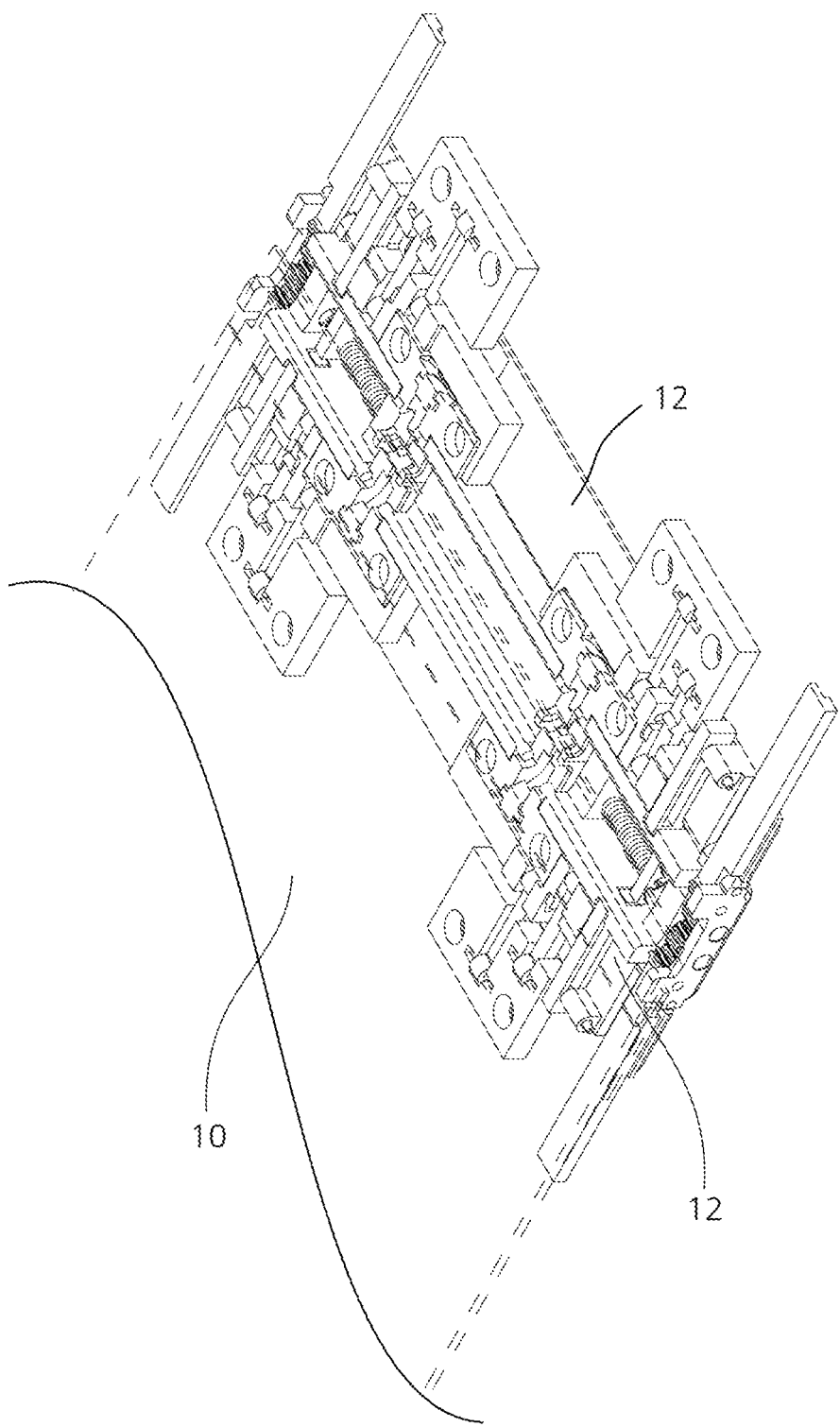

[Fig. 9]
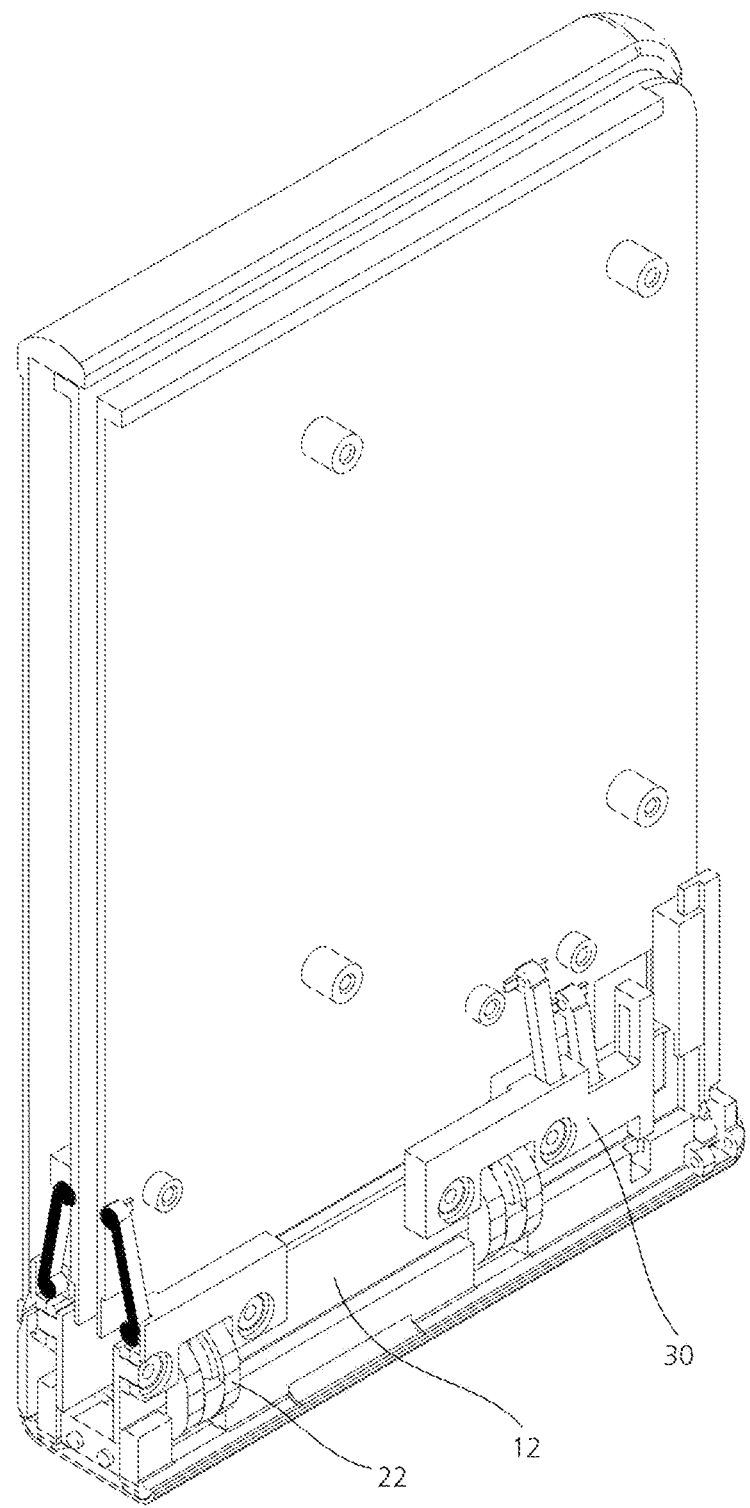

[Fig. 10]
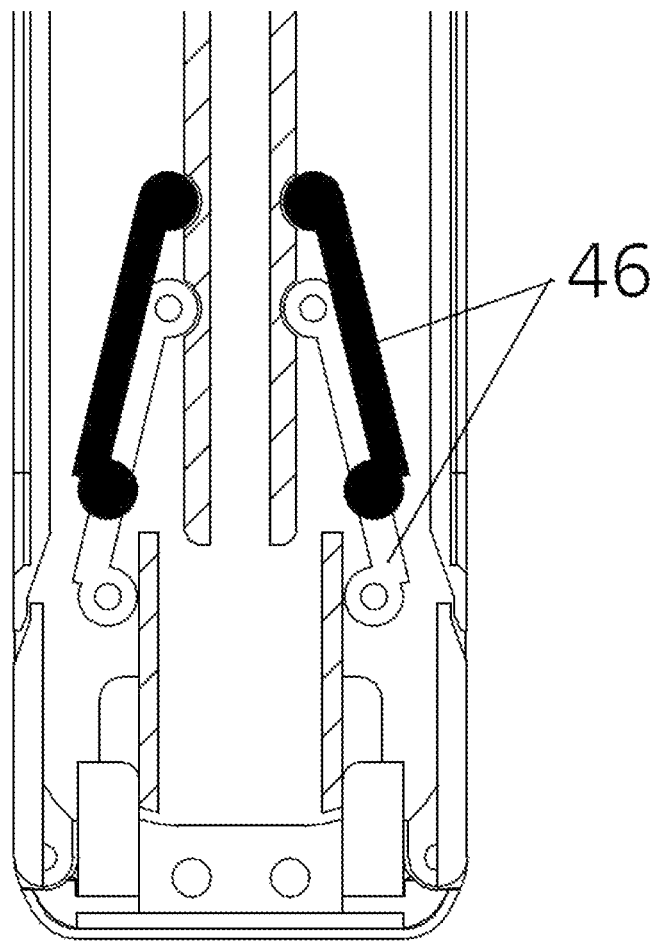

[Fig. 11]
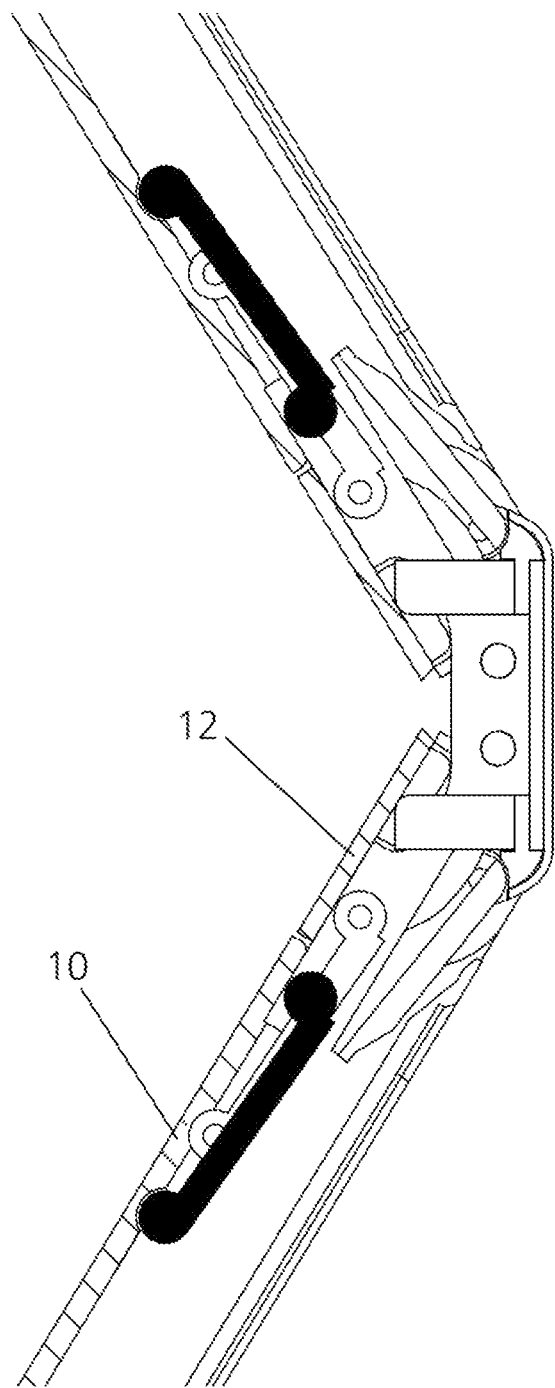

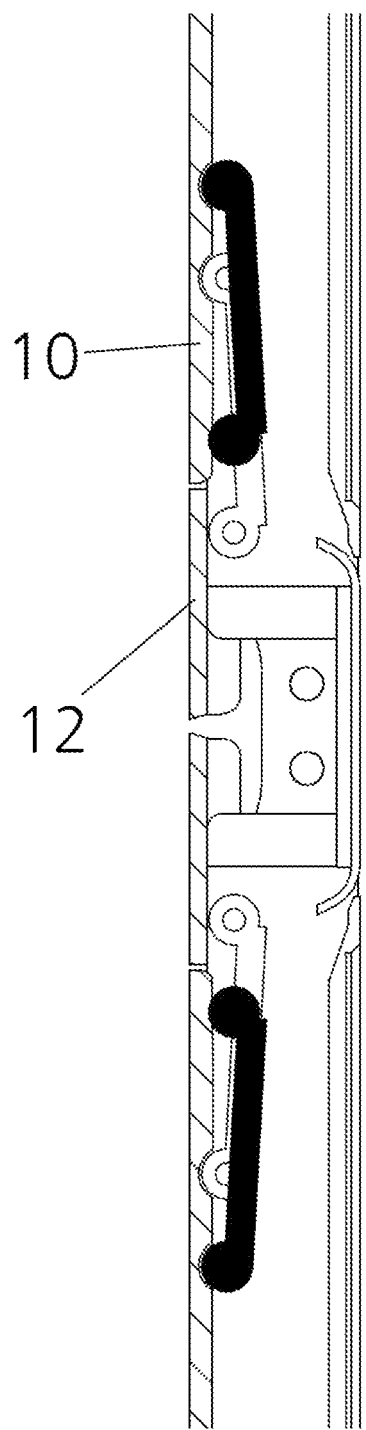
[Fig. 12]

[Fig. 13]
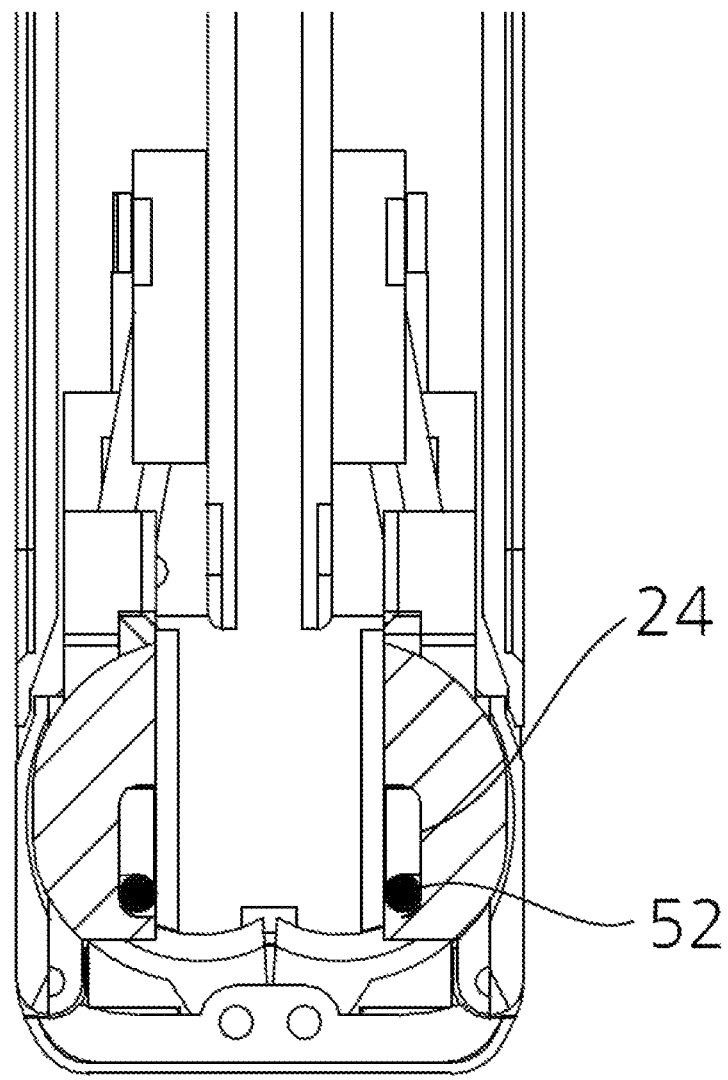

[Fig. 14]
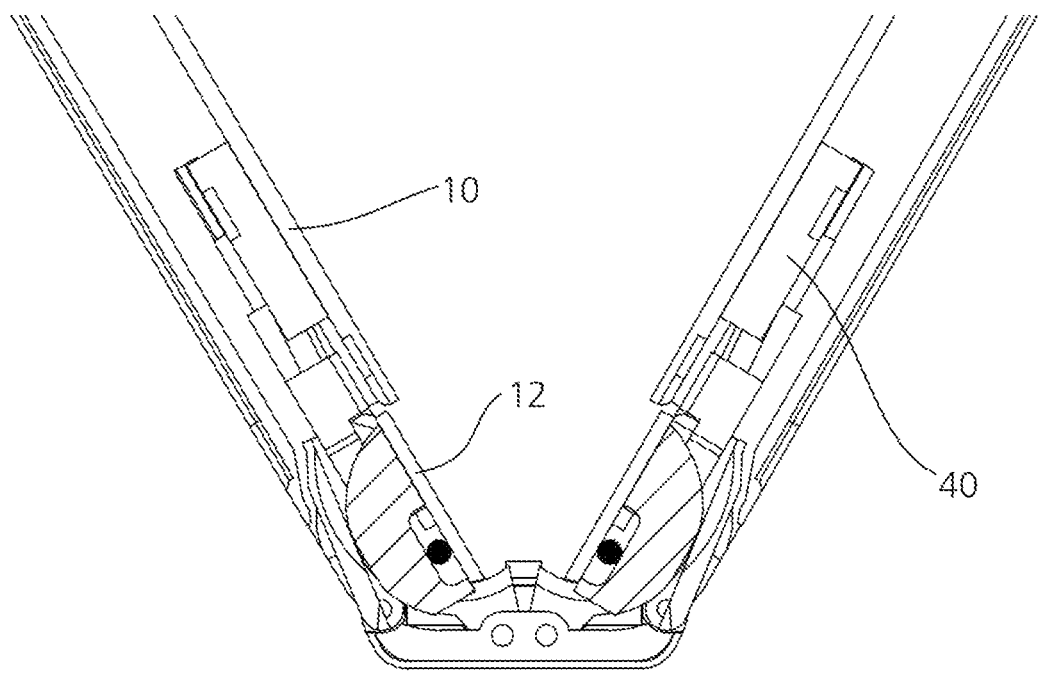

[Fig. 15]
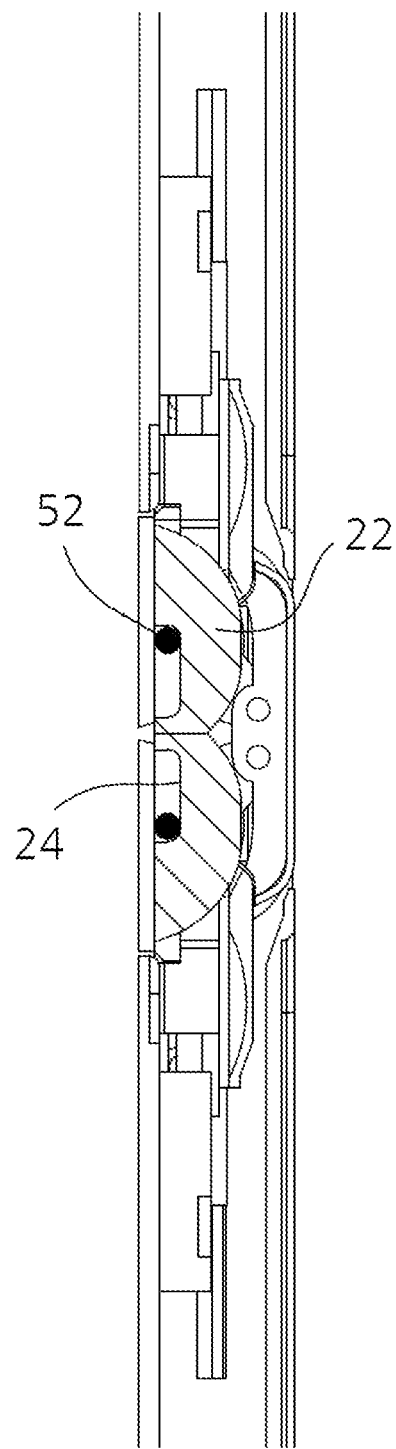

[Fig. 16]
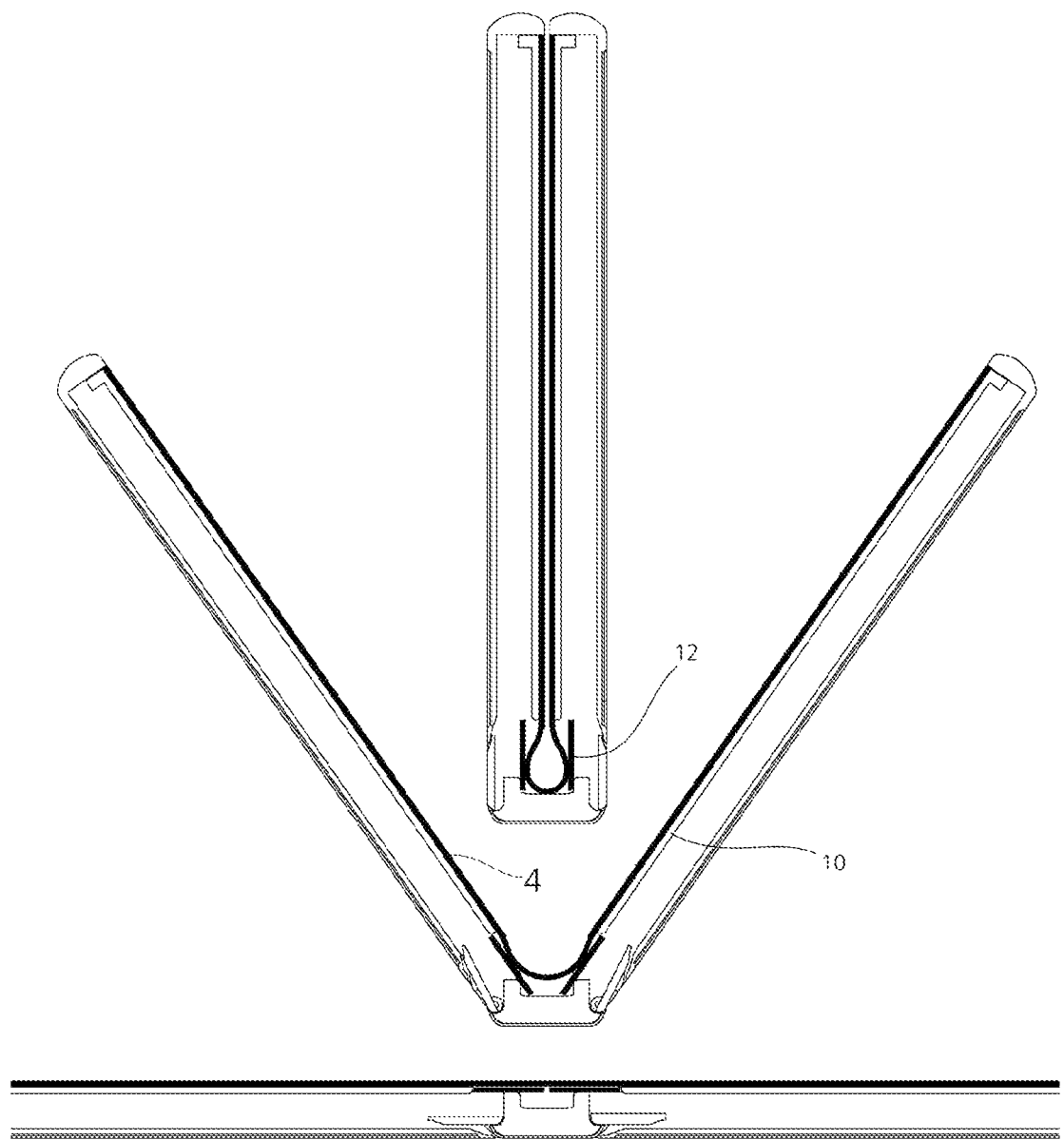

[Fig. 17]
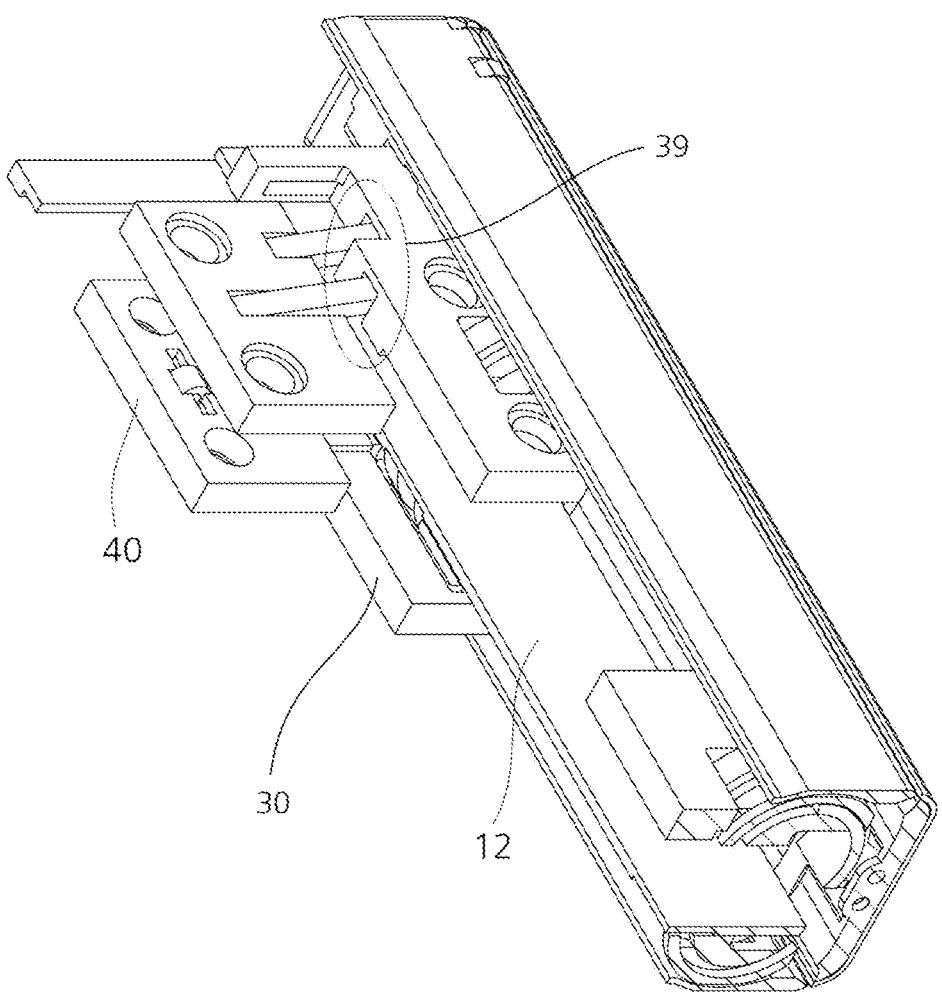

[Fig. 18]
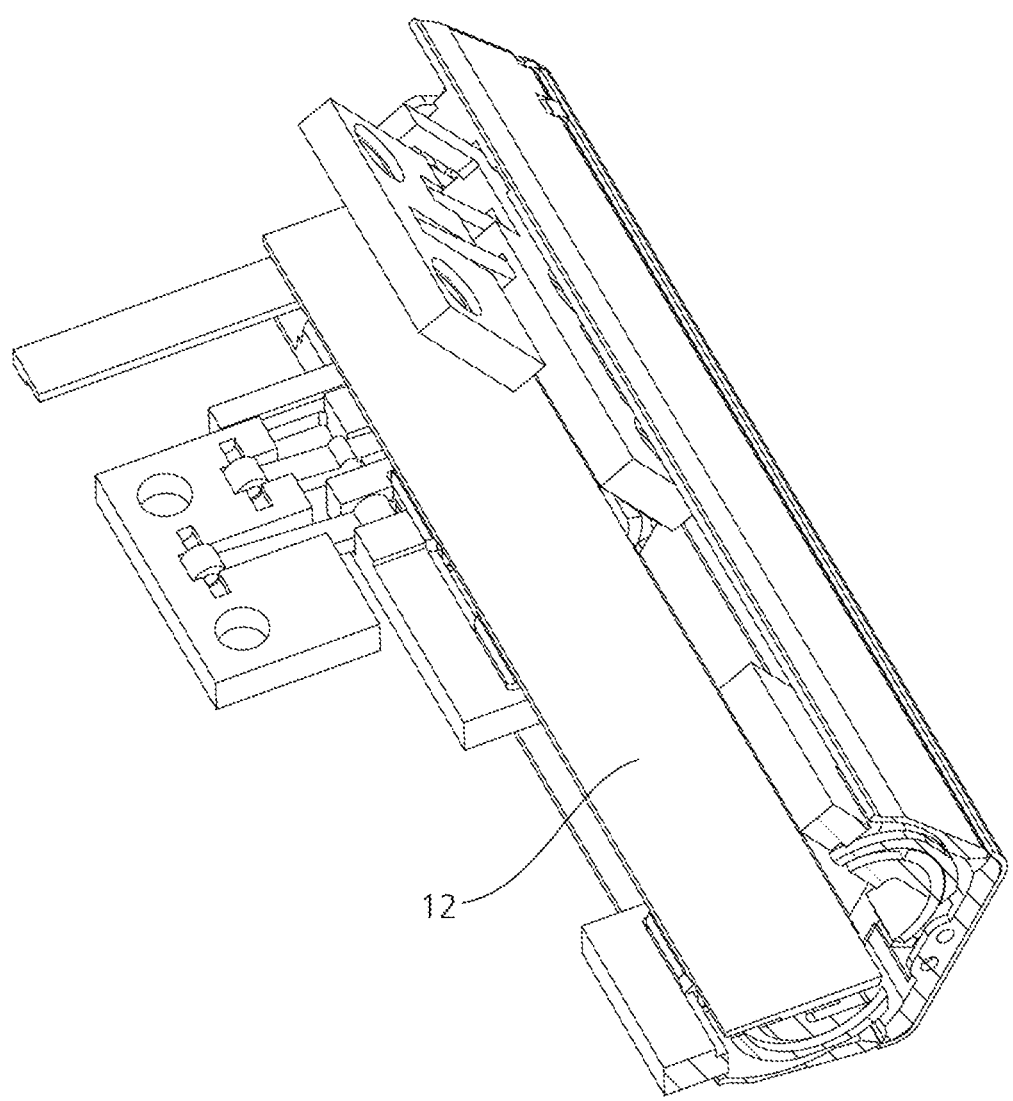

[Fig. 19]
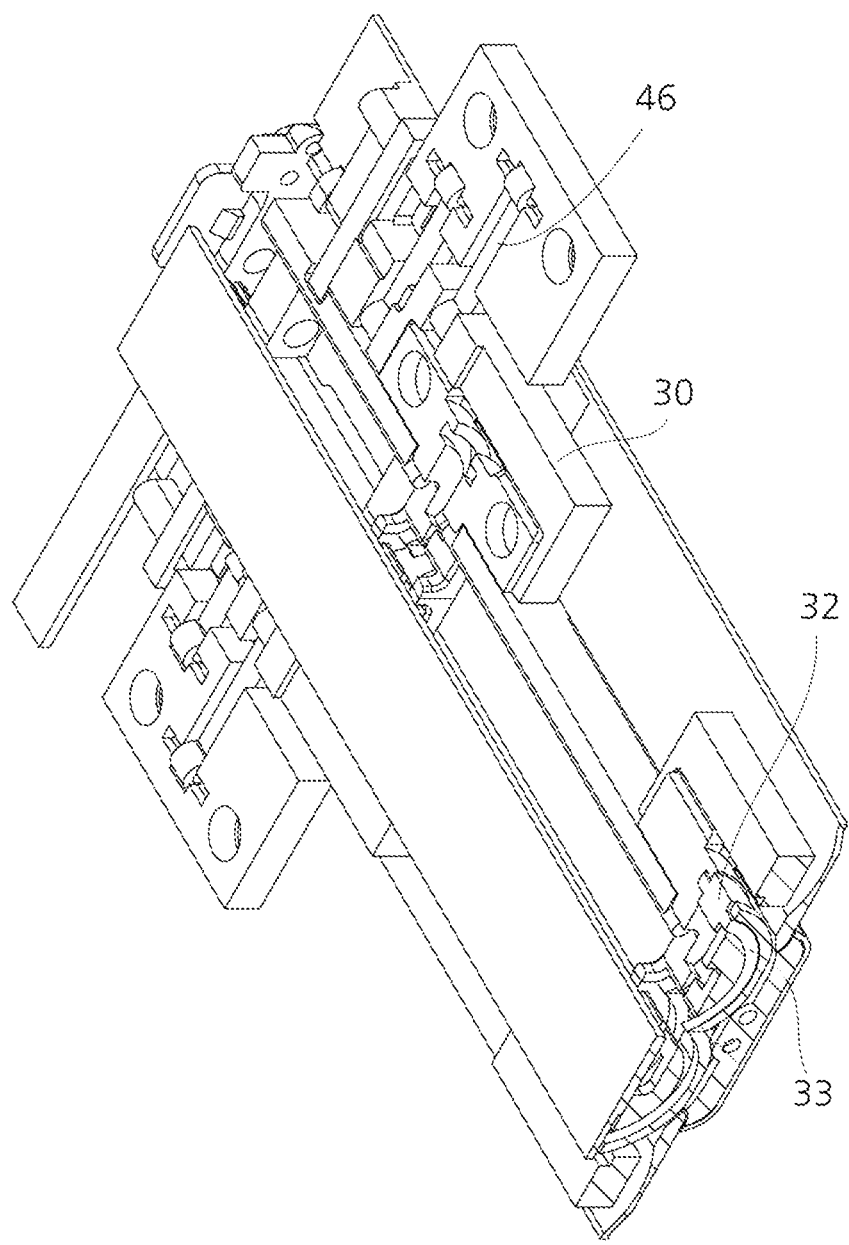

[Fig. 20]
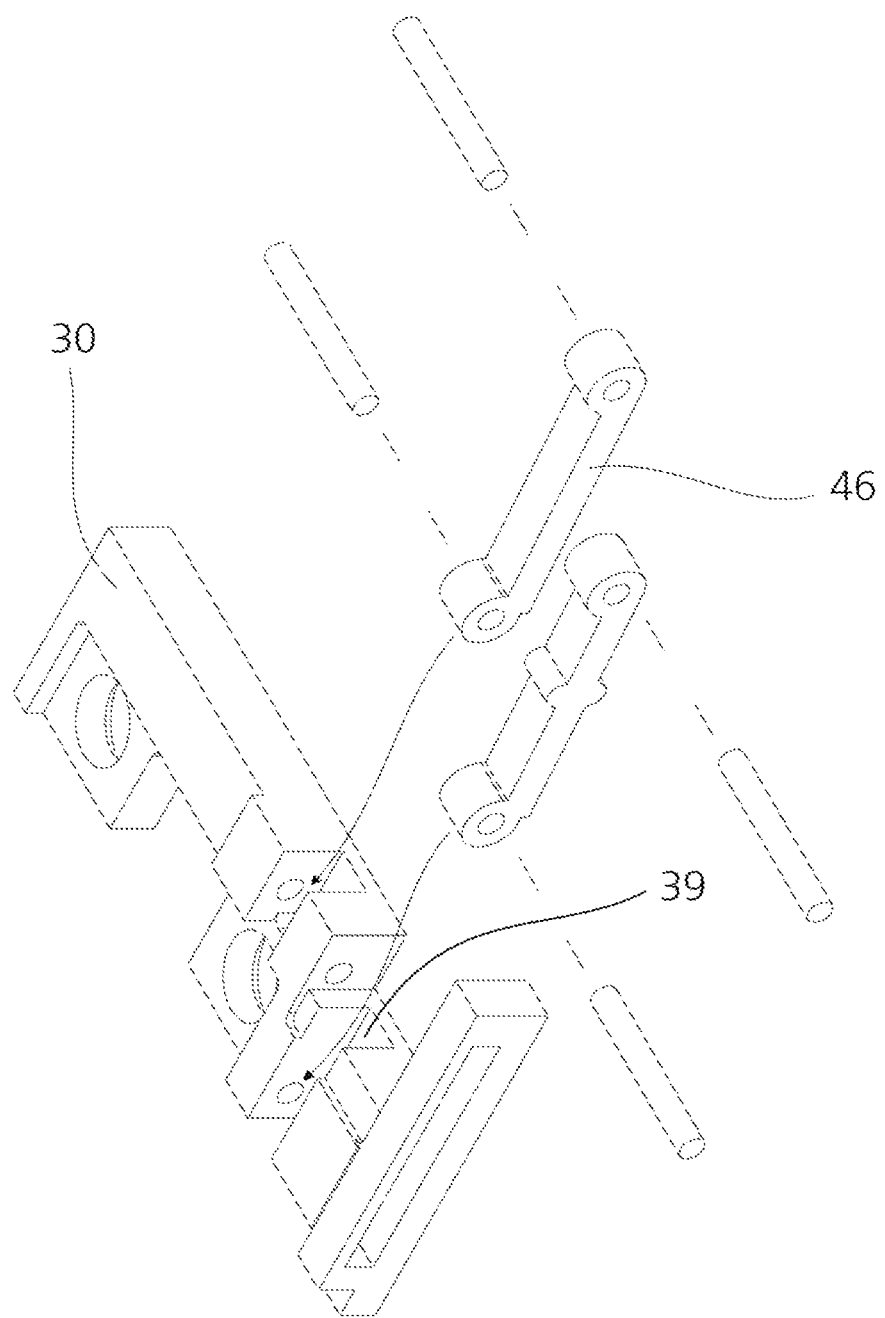

[Fig. 21]
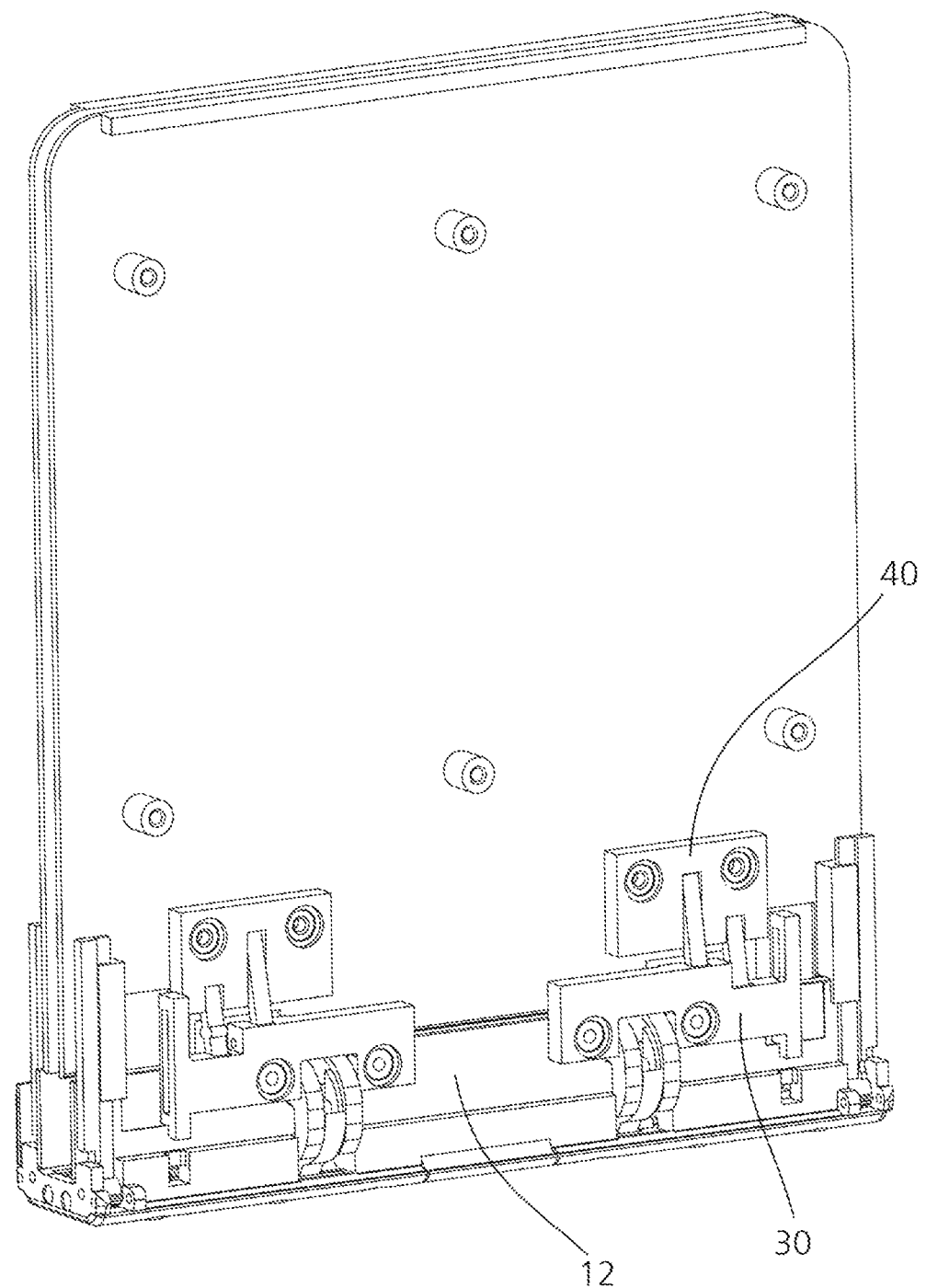

[Fig. 22]
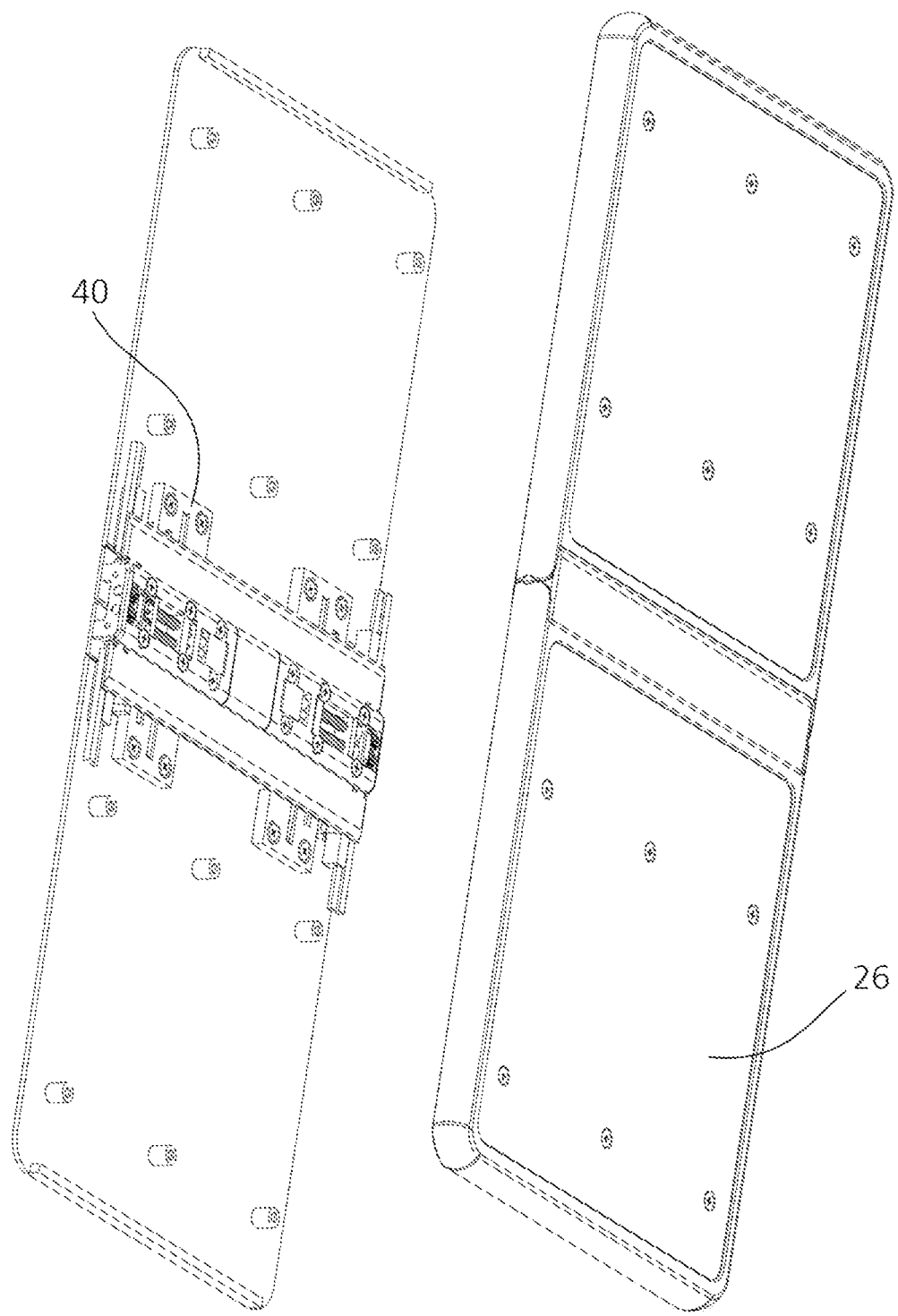

[Fig. 23]
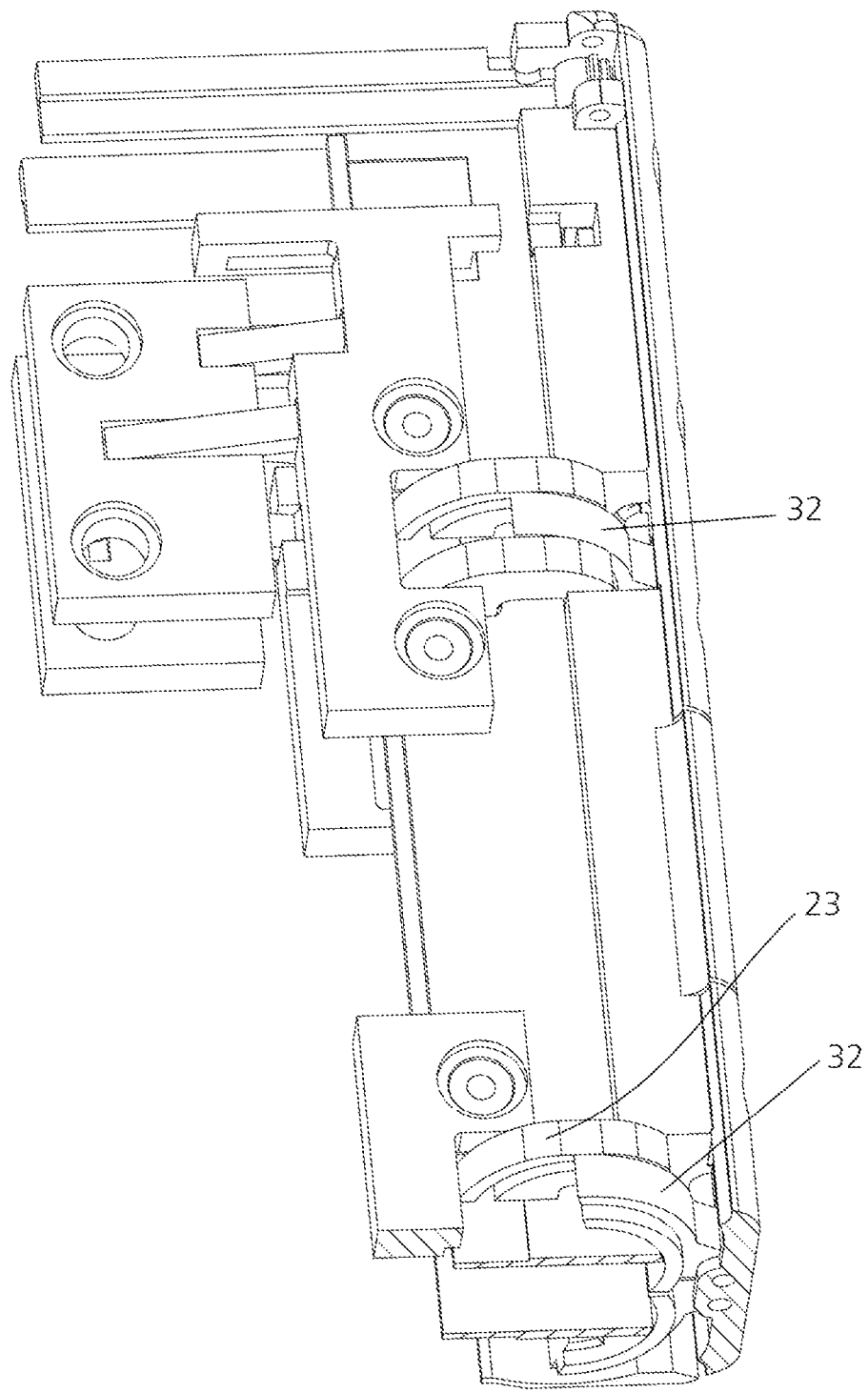

[Fig. 24]
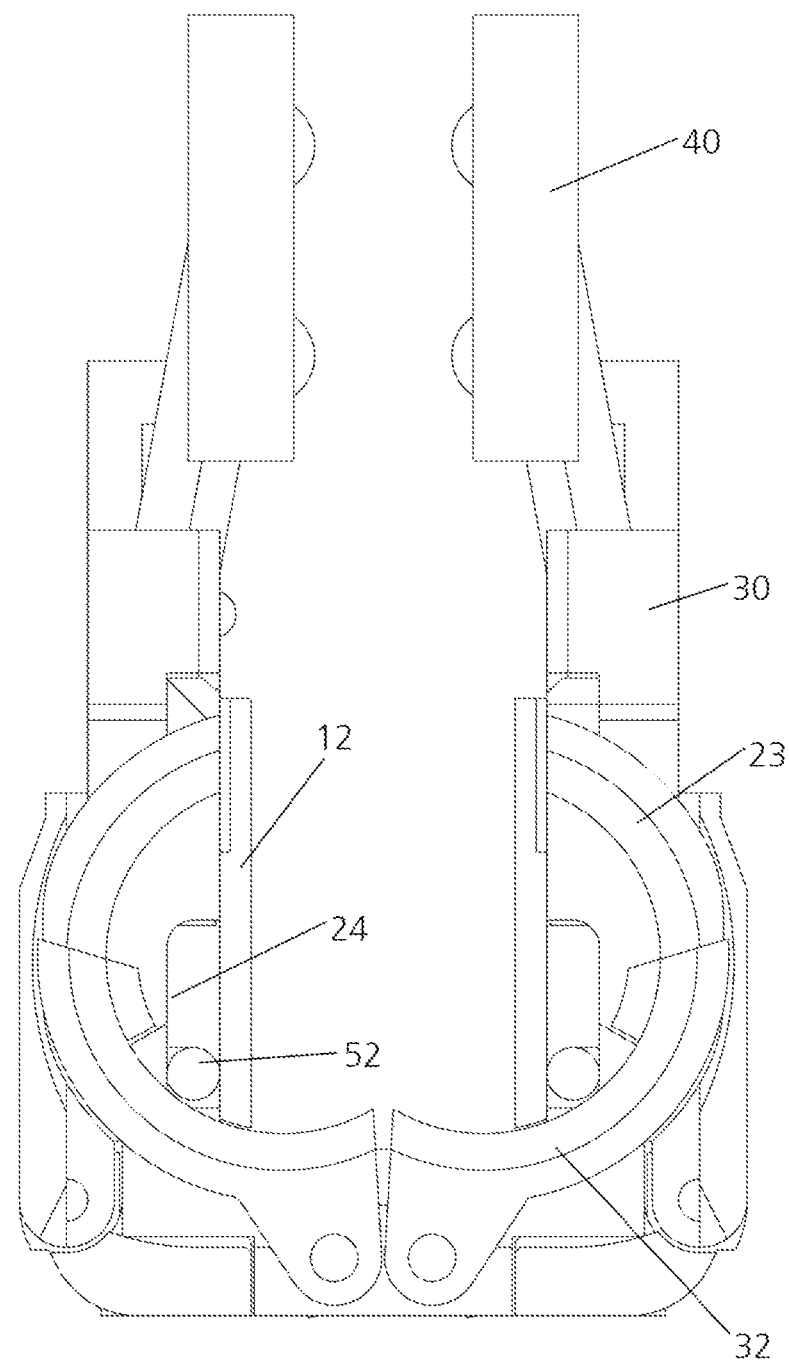

[Fig. 25]
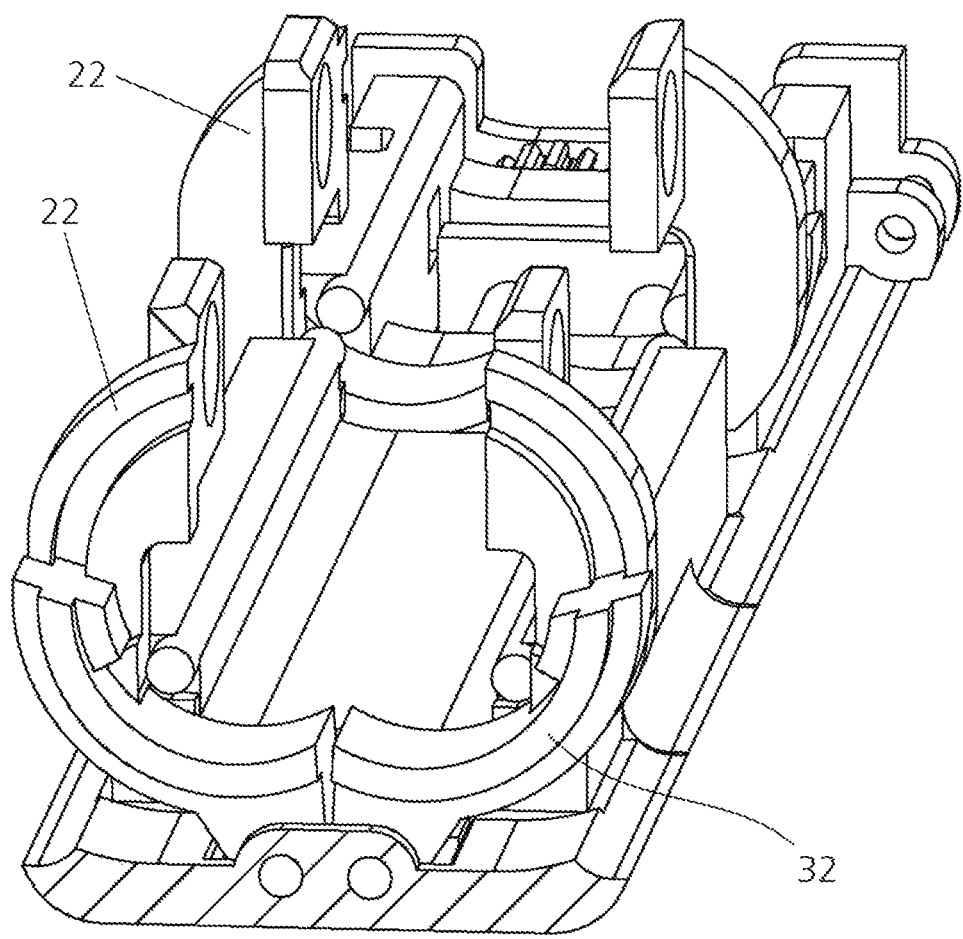

[Fig. 26]
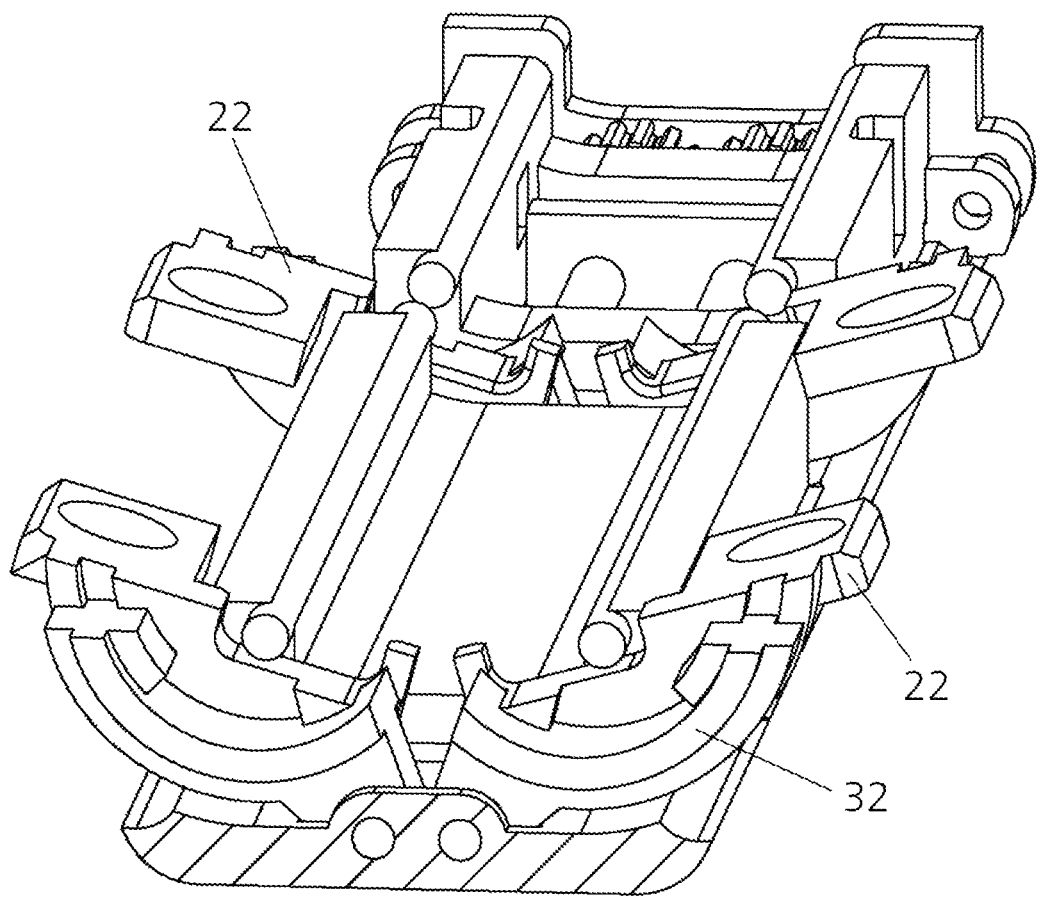

[Fig. 27]
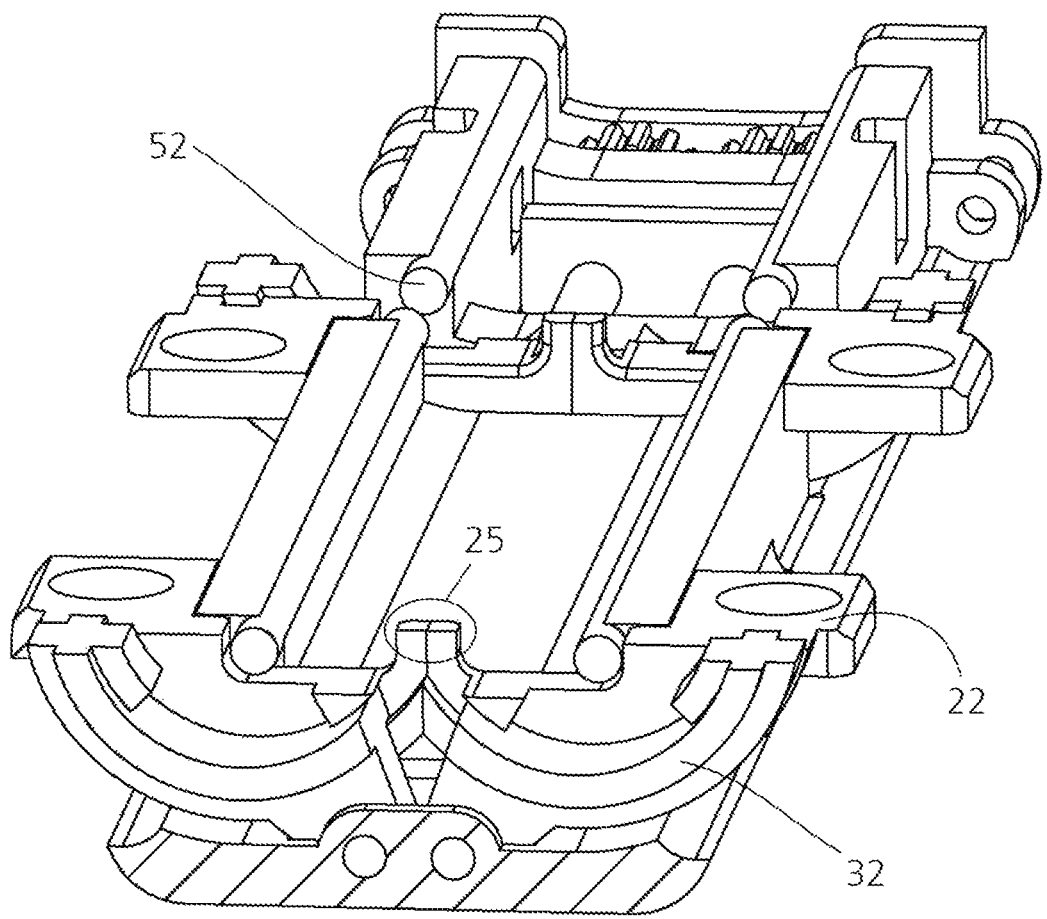

INFOLDING-TYPE HINGE STRUCTURE HAVING FLEXIBLE DISPLAY PANEL INSTALLED THEREON

TECHNICAL FIELD

The invention relates to an in-folding type hinge structure having a flexible display panel installed thereon and, more particularly, to an in-folding type hinge structure having a flexible display panel installed therein for a mobile communication terminal in which a flexible display panel is provided in two panel portions which are foldably connected to each other, in which folding units can perform a stable folding operation while the two panel portions are being folded or unfolded and the two panel portions are supported such that the panel portions do not rotate over 180 degrees when the two panel portions are fully unfolded, whereby damage of the flexible display panel provided on the surfaces of the two panel portions can be prevented.

BACKGROUND ART

Mobile communication terminals are configured to perform various functions. Examples of the functions include a data and speech communication function, a function of capturing a still image or a moving image using a camera, a speech storing function, a function of reproducing a music file using a speaker system, and a function of displaying a still image or a moving image (a video).

Some mobile communication terminals have additional functions for playing games, and some mobile communication terminals are embodied as multimedia devices. Recent mobile communication terminals can also receive broadcast or multicast signals and reproduce a video or a television program.

Researches for supporting and improving other functions of mobile communication terminals in addition to the above-mentioned functions have been carried out. These researches include modification and improvement of structural constituents of the mobile communication terminals and addition and improvement of software or hardware.

In general, a display module of a mobile communication terminal displays information which is processed by the mobile communication terminal. For example, when the mobile communication terminal is in a call mode, the display module displays a user interface (UI) or a graphic user interface (GUI) associated with a call.

When the mobile communication terminal is in a video call mode or an image capturing mode, the display module displays a captured or/and received image, a UI, or a GUI. The display module includes a liquid crystal display, a thin-film transistor liquid crystal display, an organic light emitting diode, a flexible display, or a 3D display.

A flexible display (or a flexible LCD) has been regularly researched with its merit of deformability. It takes much time to use a rolled display like a paper roll as shown in science-fiction movies.

Therefore, transitional forms of flexible displays will be many used until the flexible displays are regularly used with sufficient development thereof, and these transitional forms will be similar to current structures of communication terminals. Accordingly, there is necessity for description of usage and protection of flexible displays when such flexible displays are used in mobile communication terminals.

An example of such a hinge structure for a mobile communication terminal having a flexible display panel installed therein is disclosed in Korean Patent Application Laid-open No. 10-2015-0096827 (Title of the Invention: HINGE STRUCTURE AND FOLDABLE DISPLAY DEVICE INCLUDING THE SAME).

SUMMARY OF THE INVENTION

Technical Problem

An objective of the invention is to provide an in-folding type hinge structure having a flexible display panel installed therein for a mobile communication terminal in which a flexible display panel is provided in two panel portions which are foldably connected to each other, in which folding units can perform a stable folding operation while the two panel portions are being folded or unfolded and the two panel portions are supported such that the panel portions do not rotate over 180 degrees when the two panel portions are fully unfolded, whereby damage of the flexible display panel provided on the surfaces of the two panel portions can be prevented.

Another objective of the invention is to prevent a strong stress from being applied to a folded part of a flexible display panel by forming a sufficient gap between two auxiliary panels in a state in which the in-folding type hinge structure having a flexible display panel installed therein is folded.

Solution to Problem

In order to achieve the above-mentioned objectives, there is provided an in-folding type hinge structure having a flexible display panel installed therein, the in-folding type hinge structure including: a pair of main panels (10) and a pair of auxiliary panels (12) that have the flexible display panel installed thereon and that are provided on right and left sides of a central joint (80); and a folding hinge unit (20) that is attached to rear surfaces of the main panels (10) and the auxiliary panels (12).

The in-folding type hinge structure further includes: a folding hinge unit cover (70) that is provided on the rear surfaces of the main panels (10) and the auxiliary panels (12) to cover a bottom of the folding hinge unit (20); and a case (26) that is attached to the rear surfaces of the main panels (10) and the auxiliary panels (12).

The folding hinge unit (20) includes two pairs of folding units (21) that are provided on the right and left sides of the central joint (80).

Each folding unit (21) includes a mechanism that controls rotation of the auxiliary panels (12) and a mechanism that controls rotation of main panels (10).

The mechanism that controls the rotation of the auxiliary panels (12) includes a rotation support (32) that is inserted into a rotation shaft portion (60) of the central joint and an inside support of which a rotation guide groove (23) is inserted into a rotation guide rail (33) protruding from a side surface of the rotation support (32) and that slides rotationally, and the rotation guide groove (23) of which movement is guided along a guide protrusion (52) is formed in the inside support (22).

The inside support (22) is coupled to an auxiliary panel fixing plate (30) to which the auxiliary panels (12) are fixed.

The mechanism that controls the rotation of the main panels (10) includes a pair of connection supports (46) that is provided in the auxiliary panel fixing plate (30) to rotate while changing its height and a main panel fixing plate (40) that is provided such that the connection supports (46) rotate while changing its height.

The main panel fixing plate (40) is fixed to the rear surface of the main panel (10).

The inside support (22) is attached to the rotation support (32) and moves rotationally along the rotation guide rail (33) of the rotation support (32). When rotation shafts of a pair of rotation supports (32) are inserted into the rotation shaft portion (60) and rotate in opposite directions, the rotation supports (32) first rotate in the opposite directions and then the inside supports (22) of which movement is controlled by the guide protrusions (52) rotate along guide grooves (24).

When a pair of inside supports (22) rotates fully along the rotation guide rails (33) of the rotation supports (32), the pair of inside supports (22) is controlled by the guide protrusions (52) such that a gap is formed between a pair of auxiliary panels (12).

Accordingly, a folded part of the flexible display panel (4) is located in the gap between the pair of auxiliary panels (12).

Advantageous Effects of the Invention

With the in-folding type hinge structure having a flexible display panel installed therein for a mobile communication terminal in which a flexible display panel is provided in two panel portions which are foldably connected to each other according to the invention, it is possible to enable folding units to perform a stable folding operation while two panel portions in which the flexible display panel on which an image such as a moving image is displayed and which is formed of a flexible material is installed are being folded or unfolded and it is possible to prevent damage of the flexible display panel provided on the surfaces of the two panel portions by supporting the two panel portions such that the panel portions do not rotate over 180 degrees when the two panel portions are fully unfolded.

It is also possible to prevent a strong stress from being applied to a folded part of a flexible display panel by forming a sufficient gap between two auxiliary panels in a state in which the in-folding type hinge structure having a flexible display panel installed therein is folded such that a part of the flexible display panel which is bent in a water droplet shape is located in the gap. As a result, it is possible to improve product durability and to curb product failure even when it is used for a long time.

BRIEF DESCRIPTION OF THE DRAWINGS

FIG. 1 is an exploded perspective view of an in-folding type hinge structure having a flexible display panel installed therein according to the invention.

FIG. 2 is a perspective view of a folding hinge unit illustrated in FIG. 1.

FIG. 3 is an exploded perspective view of the folding hinge unit illustrated in FIG. 2.

FIG. 4 is a perspective view of a central joint of the holding hinge unit of the in-folding type hinge structure having a flexible display panel installed therein according to the invention.

FIG. 5 is a perspective view illustrating a state in which a rotation support and an inside support are installed in the central joint illustrated in FIG. 4.

FIG. 6 is an exploded perspective view of the central joint of the folding hinge unit in the in-folding type hinge structure having a flexible display panel installed therein according to the invention.

FIG. 7 is a perspective view illustrating a state in which the folding hinge unit in the in-folding type hinge structure having a flexible display panel installed therein according to the invention is attached to rear surfaces of main panels and auxiliary panels.

FIG. 8 is a perspective view illustrating a state in which the folding hinge unit in the in-folding type hinge structure having a flexible display panel installed therein according to the invention is attached to the main panels and the auxiliary panels.

FIG. 9 is a perspective view illustrating a state in which a pair of main panels and a pair of auxiliary panels are folded according to the invention.

FIG. 10 is a sectional view illustrating a connection support connected to a main panel fixing plate in a state in which the in-folding type hinge structure having a flexible display panel installed therein according to the invention is folded.

FIG. 11 is a sectional view illustrating a connection support connected to a main panel fixing plate in a state in which the in-folding type hinge structure having a flexible display panel installed therein according to the invention is partially unfolded.

FIG. 12 is a sectional view illustrating a connection support connected to a main panel fixing plate in a state in which the in-folding type hinge structure having a flexible display panel installed therein according to the invention is fully unfolded.

FIG. 13 is a sectional view illustrating a guide protrusion which is interposed between a guide groove and the auxiliary panel in a state in which the in-folding type hinge structure having a flexible display panel installed therein according to the invention is folded.

FIG. 14 is a sectional view illustrating a guide protrusion which is interposed between a guide groove and the auxiliary panel in a state in which the in-folding type hinge structure having a flexible display panel installed therein according to the invention is partially unfolded.

FIG. 15 is a sectional view illustrating a guide protrusion which is interposed between a guide groove and the auxiliary panel in a state in which the in-folding type hinge structure having a flexible display panel installed therein according to the invention is fully unfolded.

FIG. 16 is a sectional view illustrating a state in which a flexible display panel is accommodated between the auxiliary panels while the in-folding type hinge structure having a flexible display panel installed therein according to the invention is being folded and unfolded.

FIG. 17 is a sectional perspective view illustrating a state of a rotation support coupled to a folding unit and an inside support in the folding hinge unit in a state in which the in-folding type hinge structure having a flexible display panel installed therein according to the invention is folded.

FIG. 18 is a sectional perspective view illustrating a state of a rotation support coupled to a folding unit and an inside support in the folding hinge unit in a state in which the in-folding type hinge structure having a flexible display panel installed therein according to the invention is partially unfolded.

FIG. 19 is a sectional perspective view illustrating a state of a rotation support coupled to a folding unit and an inside support in the folding hinge unit in a state in which the in-folding type hinge structure having a flexible display panel installed therein according to the invention is fully unfolded.

FIG. 20 is an exploded perspective view illustrating a state in which a connection support is coupled to the auxiliary panel fixing plate in the in-folding type hinge structure having a flexible display panel installed therein according to the invention.

FIG. 21 is a perspective view illustrating a state in which a pair of main panels and a pair of auxiliary panels are folded according to the invention.

FIG. 22 is a perspective view illustrating a state in which the main panels and the auxiliary panels connected to each other via the folding hinge unit according to the invention are coupled to each other by a case.

FIG. 23 is an exploded sectional perspective view illustrating a state in which the folding hinge unit according to the invention is folded.

FIG. 24 is a sectional side view illustrating a state in which the folding hinge unit according to the invention is folded when seen from one side.

FIG. 25 is a perspective view illustrating a configuration of the inside support and the rotation support controlling movement of the auxiliary panels in the folding hinge unit in a state in which a pair of main panels constituting the in-folding type hinge structure having a flexible display panel installed therein according to the invention is folded.

FIG. 26 is a perspective view illustrating a configuration of the inside support and the rotation support controlling movement of the auxiliary panels in the folding hinge unit in a state in which a pair of main panels constituting the in-folding type hinge structure having a flexible display panel installed therein according to the invention is partially unfolded.

FIG. 27 is a perspective view illustrating a configuration of the inside support and the rotation support controlling movement of the auxiliary panels in the folding hinge unit in a state in which a pair of main panels constituting the in-folding type hinge structure having a flexible display panel installed therein according to the invention is fully unfolded.

REFERENCE SIGNS LIST

- 4: Flexible display panel
- 10: Main panel, 12: Auxiliary panel, 20: Folding hinge unit
- 21: Folding unit, 22: Inside support, 23: Rotation guide groove
- 24: Guide groove, 25: Stopper surface, 26: Case
- 30: Auxiliary panel fixing plate, 32: Rotation support, 33: Rotation guide rail
- 40: Main panel fixing plate, 41: Connection portion, 46: Connection support
- 52: Guide protrusion, 60: Rotation shaft portion, 70: Folding unit cover
- 62: Side cover, 80: Central joint, 92: Sliding bar

EMBODIMENTS OF THE INVENTION

FIG. 1 is a perspective view of an in-folding type hinge structure having a flexible display panel installed therein according to the invention.

Referring to FIG. 1, the in-folding type hinge structure having a flexible display panel installed therein according to the invention includes a pair of main panels 10 and a pair of auxiliary panels 12 that have the flexible display panel installed thereon and that are provided on right and left sides of a central joint 80 and a folding hinge unit 20 that is attached to rear surfaces of the main panels 10 and the auxiliary panels 12.

In a state in which the folding hinge unit 20 is provided, a folding hinge unit cover 70 is provided on the rear surfaces of the main panels 10 and the auxiliary panels 12 to cover a bottom of the folding hinge unit 20. A case 26 is attached to the rear surfaces of the main panels 10 and the auxiliary panels 12.

FIG. 2 is a perspective view of the folding hinge unit illustrated in FIG. 1. FIG. 3 is an exploded perspective view of the folding hinge unit illustrated in FIG. 2. FIG. 4 is a perspective view of the central joint of the holding hinge unit of the in-folding type hinge structure having a flexible display panel installed therein according to the invention. FIG. 5 is a partial perspective view illustrating a state in which a rotation support and an inside support are installed in the central joint illustrated in FIG. 4.

Referring to FIGS. 2 and 3, in the folding hinge unit 20 according to the invention, two pairs of folding units 21 are provided on the right and left sides of the central joint 80.

According to the invention, each folding unit 21 includes a mechanism that controls rotation of the auxiliary panels (12) and a mechanism that controls rotation of main panels 10.

In the invention, the mechanism that controls the rotation of the auxiliary panels 12 includes a rotation support 32 that is inserted into a rotation shaft portion 60 of the central joint and an inside support of which a rotation guide groove 23 is inserted into a rotation guide rail 33 protruding from a side surface of the rotation support 32 and that slides rotationally. The rotation guide groove 23 of which movement is guided along a guide protrusion 52 is formed in the inside support 22.

In the invention, the inside support 22 is coupled to an auxiliary panel fixing plate 30 to which the auxiliary panels 12 are fixed.

According to the invention, the mechanism that controls the rotation of the main panels 10 includes a pair of connection supports 46 that is provided in the auxiliary panel fixing plate 30 to rotate while changing its height and a main panel fixing plate 40 that is provided such that the connection supports 46 rotate while changing its height.

In the invention, the main panel fixing plate 40 is fixed to the rear surface of the main panel 10, The inside support 22 is attached to the rotation support 32 and moves rotationally along the rotation guide rail 33 of the rotation support 32. When rotation shafts of a pair of rotation supports 32 are inserted into the rotation shaft portion 60 and rotate in opposite directions, the rotation supports 32 first rotate in the opposite directions and then the inside supports 22 of which movement is controlled by the guide protrusions 52 rotate along guide grooves 24.

In the invention, when a pair of inside supports 22 rotates fully along the rotation guide rails 33 of the rotation supports 32, the pair of inside supports 22 is controlled by the guide protrusions 52 such that a gap is formed between a pair of auxiliary panels 12, and Accordingly, a folded part of the flexible display panel (4) is located in the gap between the pair of auxiliary panels 12 (see FIG. 16).

Referring to FIG. 5, stopper surfaces 25 of the pair of inside supports 22 come into contact with each other in a state in which the inside supports 22 are fully unfolded.

According to the invention, since the stopper surfaces 25 come into contact with each other, the pair of inside supports 22 can be prevented from rotating further in a state in which the inside supports 22 are fully unfolded and thus the auxiliary panels 12 fixed to the inside supports 22 can be prevented from rotating further in the state in which the auxiliary panels are fully unfolded.

FIG. 6 is an exploded perspective view of the central joint of the folding hinge unit in the in-folding type hinge structure having a flexible display panel installed therein according to the invention.

Referring to FIG. 6, semi-automatic drive portion (90) that semi-automatically drive folding or unfolding of the main panels 10 and the auxiliary panels 12 are provided in the central joint according to the invention.

The semi-automatic drive portion 90 according to the invention has a configuration in which a cam 96 is inserted into a shaft 93 to which a gear 98 is fixed. When the gear 98 rotates, a spring 95 inserted onto the shaft 93 applies an elastic force to the cam 96 and a sliding bar 92 is semi-automatically moved by the elastic force.

FIG. 7 is a perspective view illustrating a state in which the folding hinge unit in the in-folding type hinge structure having a flexible display panel installed therein according to the invention is attached to rear surfaces of main panels and auxiliary panels. FIG. 8 is a perspective view illustrating a state in which the folding hinge unit in the in-folding type hinge structure having a flexible display panel installed therein according to the invention is attached to the main panels and the auxiliary panels.

Referring to FIGS. 7 and 8, the auxiliary panel fixing plate 30 of the folding unit 21 is attached to the rear surfaces of the auxiliary panels 12, and the main panel fixing plate 40 is attached to the rear surfaces of the main panels 10.

In FIG. 7, a state in which rotation shafts of a pair of rotation supports 32 opposite to each other are provided in the rotation shaft portion 60 and the right and left semi-automatic drive portions 90 are excluded is illustrated.

FIG. 9 is a perspective view illustrating a state in which a pair of main panels and a pair of auxiliary panels are folded according to the invention.

Referring to FIG. 9, when a pair of main panels 10 and a pair of auxiliary panels 122 are completely folded, a space in which the folded flexible display panel 4 is accommodated is formed between the pair of auxiliary panels 12 which separately face each other.

FIG. 10 is a sectional view illustrating a connection support connected to a main panel fixing plate in a state in which the in-folding type hinge structure having a flexible display panel installed therein according to the invention is folded. FIG. 11 is a sectional view illustrating a connection support connected to a main panel fixing plate in a state in which the in-folding type hinge structure having a flexible display panel installed therein according to the invention is partially unfolded. FIG. 12 is a sectional view illustrating a connection support connected to a main panel fixing plate in a state in which the in-folding type hinge structure having a flexible display panel installed therein according to the invention is fully unfolded.

Referring to FIGS. 10 to 12, when the in-folding type hinge structure having a flexible display panel installed therein according to the invention is gradually being unfolded from the folded state, the gap between the auxiliary panels 12 which separately face each other is first the same as illustrated in FIG. 10, the main panels 10 and the auxiliary panels 12 become gradually flush with each other, and the main panels 10 and the auxiliary panels 12 have the same height in the fully unfolded state as illustrated in FIG. 12.

FIG. 13 is a sectional view illustrating a guide protrusion which is interposed between a guide groove and the auxiliary panel in a state in which the in-folding type hinge structure having a flexible display panel installed therein according to the invention is folded.

Referring to FIG. 13, in the state in which the in-folding type hinge structure having a flexible display panel installed therein according to the invention is folded, the gap between the pair of auxiliary panels 12 is controlled by the gap between the guide protrusions 52 facing each other.

FIG. 14 is a sectional view illustrating a guide protrusion which is interposed between a guide groove and the auxiliary panel in a state in which the in-folding type hinge structure having a flexible display panel installed therein according to the invention is partially unfolded.

Referring to FIG. 14, when the in-folding type hinge structure having a flexible display panel installed therein according to the invention is being unfolded, each inside support 22 rotates along the rotation guide rail 33 of the corresponding rotation support 32. The locus of rotation is controlled by the corresponding guide groove 24 which moves along the corresponding guide protrusion 52.

FIG. 15 is a sectional view illustrating a guide protrusion which is interposed between a guide groove and the auxiliary panel in a state in which the in-folding type hinge structure having a flexible display panel installed therein according to the invention is fully unfolded.

Referring to FIG. 15, when the in-folding type hinge structure having a flexible display panel installed therein according to the invention is fully unfolded, the rotation shafts of a pair of rotation supports 32 rotates with respect to the rotation shaft portion 60, and the auxiliary panels 12 and the main panels 10 are aligned to be flush with each other.

The parts of the connection supports 46 and the main panel fixing plates 46 rotate together such that the main panel fixing plate 40 and the auxiliary panel fixing plate 30 are flush with each other, and the main panels 10 and the auxiliary panels 12 are aligned to be flush with each other.

FIG. 16 is a sectional view illustrating a state in which a flexible display panel is accommodated between the auxiliary panels while the in-folding type hinge structure having a flexible display panel installed therein according to the invention is being folded and unfolded.

Referring to FIG. 16, in the state in which the in-folding type hinge structure having a flexible display panel installed therein according to the invention is folded, a part of the flexible display panel 4 according to the invention is folded in a water droplet shape is located between the auxiliary panels 12. In the state in which the in-folding type hinge structure is fully unfolded, the folded part of the flexible display panel 4 is supported by the auxiliary panels 12.

FIG. 17 is a sectional perspective view illustrating a state of a rotation support coupled to a folding unit and an inside support in the folding hinge unit in a state in which the in-folding type hinge structure having a flexible display panel installed therein according to the invention is folded. FIG. 18 is a sectional perspective view illustrating a state of a rotation support coupled to a folding unit and an inside support in the folding hinge unit in a state in which the in-folding type hinge structure having a flexible display panel installed therein according to the invention is partially unfolded. FIG. 19 is a sectional perspective view illustrating a state of a rotation support coupled to a folding unit and an inside support in the folding hinge unit in a state in which the in-folding type hinge structure having a flexible display panel installed therein according to the invention is fully unfolded.

Referring to FIGS. 17 to 19, a stopper 39 is configured such that a part in which the connection support 46 is provided in the auxiliary panel fixing plate 30 rotates in only one direction. Accordingly, a pair of main panel fixing plates 40 can move only inward.

FIG. 20 is an exploded perspective view illustrating a state in which a connection support is coupled to the auxiliary panel fixing plate in the in-folding type hinge structure having a flexible display panel installed therein according to the invention.

Referring to FIG. 20, the stopper 39 that limits rotational movement of the connection support 46 is formed in the auxiliary panel fixing plate 30 according to the invention.

FIG. 21 is a perspective view illustrating a state in which a pair of main panels and a pair of auxiliary panels are folded according to the invention.

Referring to FIG. 21, each auxiliary panel fixing plate 30 is fixed to the corresponding auxiliary panel 12, and each main panel fixing plate 40 is fixed to the corresponding main panel 10. Since the main panel 10 is configured in partial contact with the auxiliary panel fixing plate 30, the auxiliary panel fixing plate 30 serves as a stopper to limit the rotational movement of the main panel.

FIG. 22 is a perspective view illustrating a state in which the main panels and the auxiliary panels connected to each other via the folding hinge unit according to the invention are coupled to each other by a case.

Referring to FIG. 22, the case 26 is coupled to protrusions on the rear surface of the main panel 10 with screws or the like.

FIG. 23 is an exploded sectional perspective view illustrating a state in which the folding hinge unit according to the invention is folded. FIG. 24 is a sectional side view illustrating a state in which the folding hinge unit according to the invention is folded when seen from one side.

Referring to FIGS. 22 and 23, the inside supports 22 are coupled to the auxiliary panel fixing plates 60 and the auxiliary panels 12.

The rotation shafts of the rotation supports 32 are inserted into the rotation shaft portion 60 of the central joint 80. The inside supports 23 are configured to rotate in the rotation supports 32.

FIG. 25 is a perspective view illustrating a configuration of the inside support and the rotation support controlling movement of the auxiliary panels in the folding hinge unit in a state in which a pair of main panels constituting the in-folding type hinge structure having a flexible display panel installed therein according to the invention is folded. FIG. 26 is a perspective view illustrating a configuration of the inside support and the rotation support controlling movement of the auxiliary panels in the folding hinge unit in a state in which a pair of main panels constituting the in-folding type hinge structure having a flexible display panel installed therein according to the invention is partially unfolded. FIG. 27 is a perspective view illustrating a configuration of the inside support and the rotation support controlling movement of the auxiliary panels in the folding hinge unit in a state in which a pair of main panels constituting the in-folding type hinge structure having a flexible display panel installed therein according to the invention is fully unfolded.

Referring to FIGS. 25 to 27, in a state in which a pair of inside supports 22 is fully unfolded, the stopper surfaces 25 of the inside supports 22 come into contact with each other and thus rotation of the pair of inside supports 22 is limited. Accordingly, the auxiliary panels 12 do not rotate further.

Since the stopper 39 of the auxiliary panel fixing plate 30 coupled to the inside support 22 and a part of the main panel 10 come into contact with the auxiliary panel fixing plate 30 and rotation thereof is limited, reverse rotation of the main panel 10 is also limited (see FIG. 15).

INDUSTRIAL APPLICABILITY

While an exemplary embodiment of the invention has been described above using specific terms, such description is only for explanation and it is obvious that the embodiment can be modified in various forms without departing from the technical spirit and scope of the appended claims. Such modified embodiments should not be understood separately from the spirit and scope of the invention and should belong to the appended claims.

The invention claimed is:

1. An in-folding type hinge structure having a flexible display panel installed thereon, the in-folding type hinge structure comprising:
a pair of main panels (10) and a pair of auxiliary panels (12) that have the flexible display panel installed thereon and that are provided on right and left sides of a central joint (80);
a folding hinge unit (20) that is attached to rear surfaces of the main panels (10) and the auxiliary panels (12);
a folding hinge unit cover (70) that is provided on the rear surfaces of the main panels (10) and the auxiliary panels (12) to cover a bottom of the folding hinge unit (20); and
a case (26) that is attached to the rear surfaces of the main panels (10) and the auxiliary panels (12),
wherein the folding hinge unit (20) includes two pairs of folding units (21) that are provided on the right and left sides of the central joint (80),
wherein each folding unit (21) includes a mechanism that controls rotation of the auxiliary panels (12) and a mechanism that controls rotation of main panels (10),
wherein the mechanism that controls the rotation of the auxiliary panels (12) includes a rotation support (32) that is inserted into a rotation shaft portion (60) of the central joint and an inside support of which a rotation guide groove (23) is inserted into a rotation guide rail (33) protruding from a side surface of the rotation support (32) and that slides rotationally, and the rotation guide groove (23) of which movement is guided along a guide protrusion (52) is formed in the inside support (22),
wherein the inside support (22) is coupled to an auxiliary panel fixing plate (30) to which the auxiliary panels (12) are fixed,
wherein the mechanism that controls the rotation of the main panels (10) includes a pair of connection supports (46) that is provided in the auxiliary panel fixing plate (30) to rotate while changing its height and a main panel fixing plate (40) that is provided such that the connection supports (46) rotate while changing its height,
wherein the main panel fixing plate (40) is fixed to the rear surface of the main panel (10),
wherein the inside support (22) is attached to the rotation support (32) and moves rotationally along the rotation guide rail (33) of the rotation support (32),
wherein, when rotation shafts of a pair of rotation supports (32) are inserted into the rotation shaft portion (60) and rotate in opposite directions, the rotation supports (32) first rotate in the opposite directions and then the inside supports (22) of which movement is controlled by the guide protrusions (52) rotate along guide grooves (24), wherein, when a pair of inside supports (22) rotates fully along the rotation guide rails (33) of the rotation supports (32), the pair of inside supports (22) is controlled by the guide protrusions (52) such that a gap is formed between a pair of auxiliary panels (12), and wherein a folded part of the flexible display panel (4) is located in the gap between the pair of auxiliary panels (12).

2. The in-folding type hinge structure having a flexible display panel installed thereon according to claim 1, wherein stopper surfaces (25) of the pair of inside supports (22) come into contact with each other in a state in which the inside supports (22) are fully unfolded, and wherein the contact between the stopper surfaces (25) prevents the pair of inside supports (22) from rotating further in a state in which the inside supports (22) are fully unfolded to prevent the auxiliary panels (12) fixed to the inside supports (22) from rotating further in the state in which the auxiliary panels are fully unfolded.

* * * * *